(12) United States Patent
Pippin et al.

(10) Patent No.: US 11,956,297 B2
(45) Date of Patent: *Apr. 9, 2024

(54) JOINING AND DIMENSIONAL ANNOTATION IN A STREAMING PIPELINE

(71) Applicant: YAHOO ASSETS LLC, Dulles, VA (US)

(72) Inventors: Michael Pippin, Sunnyvale, CA (US); David Willcox, Urbana, IL (US); Allie K. Watfa, Urbana, IL (US); George Aleksandrovich, Hoffman Estates, IL (US)

(73) Assignee: YAHOO ASSETS LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/155,026

(22) Filed: Jan. 16, 2023

(65) Prior Publication Data

US 2023/0156066 A1 May 18, 2023

Related U.S. Application Data

(63) Continuation of application No. 16/881,512, filed on May 22, 2020, now Pat. No. 11,558,446.

(51) Int. Cl.
| | |
|---|---|
| G06F 7/32 | (2006.01) |
| G06F 16/2455 | (2019.01) |
| H04L 45/028 | (2022.01) |
| H04L 51/18 | (2022.01) |
| H04L 65/75 | (2022.01) |
| H04L 67/01 | (2022.01) |
| H04L 67/104 | (2022.01) |
| H04L 67/2871 | (2022.01) |

(52) U.S. Cl.
CPC ............. *H04L 65/765* (2022.05); *G06F 7/32* (2013.01); *G06F 16/24568* (2019.01); *H04L 45/028* (2013.01); *H04L 51/18* (2013.01); *H04L 67/01* (2022.05); *H04L 67/1046* (2013.01); *H04L 67/2871* (2013.01)

(58) Field of Classification Search
CPC ..... G06F 16/2456; G06F 7/32; H04L 65/605; H04L 67/42; H04L 67/2871; H04L 67/1046; H04L 51/18; H04L 45/028
USPC .......................................................... 707/756
See application file for complete search history.

(56) References Cited

U.S. PATENT DOCUMENTS 9,069,681 B1 6/2015 Qiu et al.
11,558,446 B2 * 1/2023 Pippin ..................... H04L 67/01
(Continued)

*Primary Examiner* — Robert W Beausoliel, Jr.
*Assistant Examiner* — Lauren Zannah Ganger
(74) *Attorney, Agent, or Firm* — James J. DeCarlo; Greenberg Traurig, LLP

(57) ABSTRACT

Disclosed are embodiments for providing batch performance using a stream processor. In one embodiment, a method is disclosed comprising receiving, at a stream processor, an event, the stream processor including a plurality of processing stages; generating, by the stream processor, an augmented event based on the event, the augmented event including at least one additional field not appearing in the event, the additional field generated by an operation selected from the group consisting of a join or dimensional annotation operation; and emitting, by the stream processor, the augmented event to downstream consumer.

20 Claims, 11 Drawing Sheets

(56) References Cited

U.S. PATENT DOCUMENTS

2015/0040144 A1* 2/2015 Mineno ................ G06Q 50/06
719/318
2018/0322170 A1 11/2018 Alberton et al.

* cited by examiner

JOINING AND DIMENSIONAL ANNOTATION IN A STREAMING PIPELINE

CROSS REFERENCE TO RELATED APPLICATIONS

This application is a continuation of and claims priority from U.S. patent application Ser. No. 16/881,512, filed May 22, 2020, which is incorporated herein in its entirety by reference.

COPYRIGHT NOTICE

This application includes material that may be subject to copyright protection. The copyright owner has no objection to the facsimile reproduction by anyone of the patent disclosure, as it appears in the Patent and Trademark Office files or records, but otherwise reserves all copyright rights whatsoever.

BACKGROUND

In the era of big data processing, data pipelines have become vital to ingesting, processing, and outputting large quantities of data at high velocity and having high variability. In general, a data pipeline comprises a series of automated processing stages that take raw input data and convert the raw input data into a more suitable format for consumption by downstream computer processing systems.

Various architectures of data pipelines exist, including batch, Lambda, and Kappa architectures. Batch data pipelines process data in "batches" at regular intervals and are suitable for non-critical functionality while providing high reliability of data processing. Batch data pipelines, however, suffer from not being able to process data in real-time. Thus, a lag behind the ingestion of data and output of useful information or knowledge always exists in a batch data pipeline.

Lambda pipelines utilize a batch processor concurrently with a stream processor. In these pipelines, the batch processor processes all data within a historical batch while the stream processor "augments" the processed batch data with the results of stream processing. Eventually, the batch processor will "re-process" the data processed by the stream processor and overwrite the information generated by the stream processor. Lambda pipelines are fast, due to the use of stream processors; however, they require duplication of processing logic in both the stream processors and the batch processors. Further, Lambda pipelines use twice the processing hardware due to the use of two separate processing paradigms (i.e., stream and batch, which process the data in the same manner).

Like Lambda pipelines, Kappa pipelines utilize a stream processor. However, Kappa pipelines eschew a batch processor. Kappa pipelines require frequent "re-running" of event streams through the stream processor to provide simulated batch performance. Kappa pipelines ensure that streaming data is processed correctly (e.g., the pipeline does not drop or duplicate data); however, these pipelines ensure this by re-executing processing and are thus slower than pure streaming pipelines. Further, since Kappa pipelines use stream processing techniques, there is no method for performing more complex operations such as joins or aggregations, since these operations inherently require access to a full (e.g., batch) dataset. That is, stream processors inherently cannot perform these operations, thus replaying streams does not remedy this problem.

BRIEF SUMMARY

This disclosure recognizes a need in the art for a new pipeline architecture that provides the advantages of stream processors (e.g., speed) with the advantages of batch processors (e.g., integrity and complex operations). The disclosed embodiments provide these advantages and solve other problems in existing pipelines.

The disclosed embodiments describe an improved big data processing system that uses a stream processing engine with additional hardware and software to harden inaccuracies detected during stream processing.

In one embodiment, a method is disclosed comprising receiving, at a stream processor, an event, the stream processor including a plurality of processing stages; generating, by the stream processor, an augmented event based on the event, the augmented event including at least one additional field not appearing in the event, the additional field generated by an operation selected from the group consisting of a join or dimensional annotation operation; and emitting, by the stream processor, the augmented event to downstream consumer.

In another embodiment, a non-transitory computer-readable storage medium for tangibly storing computer program instructions capable of being executed by a computer processor is disclosed, the computer program instructions defining the steps of: receiving, at a stream processor, an event, the stream processor including a plurality of processing stages; generating, by the stream processor, an augmented event based on the event, the augmented event including at least one additional field not appearing in the event, the additional field generated by an operation selected from the group consisting of a join or dimensional annotation operation; and emitting, by the stream processor, the augmented event to downstream consumer.

The illustrated embodiments provide numerous benefits over existing pipelines. The disclosed embodiments reduce data processing and certification times by certifying events using a stream processor versus a batch processor. Thus, the illustrated embodiments, do not require a "waiting" period prior to certifying results and can certify results in real-time or near real-time. The disclosed embodiments additionally utilize a single pipeline and thus do not require the hardware duplication, software complexity, and human resources required by Lambda pipelines. Relatedly, since application-level code must only be deployed once, rapid changes in data processing can be implemented without requiring separate development workflows. Additionally, since only one codebase is used, there is no risk of variations in processing between pipelines. Finally, in existing pipelines, sacrifices for speed can lead to a more significant variation between the initially posted results from the streaming pipeline and the final results from batch processing. As the latency of batch increases relative to streaming, this can lead to a lack of confidence in reporting as the variation becomes more pronounced. The disclosed embodiments alleviate this deficiency.

DETAILED DESCRIPTION

Figure 1A:
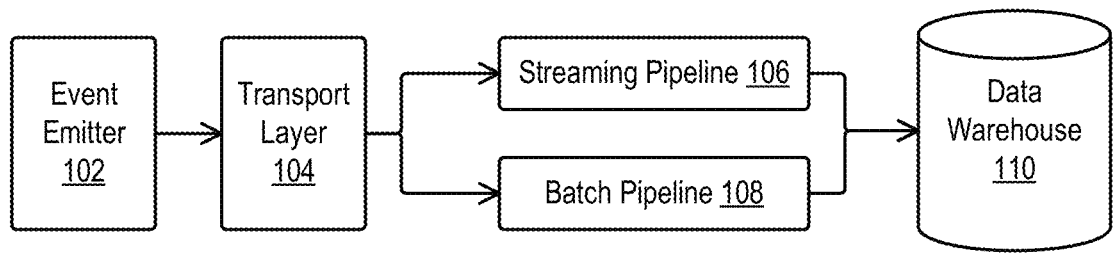
FIG. 1A is a block diagram illustrating a processing system employing a Lambda architecture.

FIG. 1A is a block diagram illustrating a processing system employing a Lambda architecture.

In the illustrated embodiment, events in the system (100a) originate from one or more event emitters (102). As used herein, an event refers to any type of data generated by a computing system. Generally, most events include arbitrary data as well as a timestamp indicating when the event emitter (102) generated the data. Alternatively, or in conjunction with the preceding, the system (100a) adds a timestamp representing the time the pipelines (106, 108) receive the event. In some embodiments, the timestamp comprises a standard time (e.g., based on a 24-hour clock). In some embodiments, the timestamp comprises a numerical value (e.g., time since UNIX epoch). In other embodiments, the timestamp may comprise a sequence number or other incrementing (or otherwise changing) value. In some embodiments, events further include nonce values to ensure uniqueness.

The event emitters (102) can comprise any computing system capable of generating data. The disclosure places no limitations on the type of data or type of systems capable of generating such data. As one example, an event emitter may include a digital analytics system configured to track and monitor user events on webpages or in mobile apps. A digital analytics platform generates many events as users access products. One example is the delivery of advertising creatives. In these scenarios, the analytics platform generates an event indicating that a server transmitted the creative to the end-user. The analytics platform also generates an event indicating that the end-user device displayed the creative (i.e., an impression). If the end-user interacts with the creative, the analytics platform generates a "click" event (which may be any type of interaction including touch events and thus is not limited to physical mouse clicks). In certain embodiments, the analytics platform also generates conversion events that indicate that after an impression, and after a click, the end-user has completed another action (e.g., completes a digital purchase) that is related to the previous events. In some embodiments, the analytics platform tracks all of these events via a client-side identifier stored in, for example, a cookie or other end-user storage mechanism.

In some embodiments, event emitters (102) are part of the system (100a). That is, in some embodiments, the system (100a) includes and has some level of control over the event emitters (102). Examples of this type of arrangement include internal data sources for an organization (e.g., internal analytics tracking). In other embodiments, the event emitters (102) comprise third-party systems. In some embodiments, the system (100a) receives events from both internal and external event emitters (102).

In either scenario, event emitters (102) transmit events over a transport layer (104). The transport layer (104) comprises one or more network protocols and one or more physical media used for transporting data. The disclosure does not unduly limit the structure of the transport layer. In some embodiments, the system (100a) uses an Internet protocol suite (e.g., transmission control protocol (TCP) and Internet protocol (IP)) as the transport layer (104). The system (100a) may use other models such as those adhering to the Open Systems Interconnection (OSI) model or other types of protocol models. In some embodiments, the transport layer (104) performs other operations on the events beyond network routing (e.g., TCP/IP). For example, the transport layer (104) may compress events using, as an example, gzip or other compression algorithms.

The specific internal workings of the transport layer (104) are not limiting, and the system (100a) may ignore various features of the transport layer (104) that are handled entirely in the transport layer (e.g., congestion control in a TCP layer). However, as discussed in more detail herein, the transport layer (104) may include inherent data transfer characteristics that impact the processing of the data by systems. One example, discussed in more detail in FIG. 2 et seq, is that some transport layer (104) designs may unintentionally (or, in some cases, intentionally) duplicate events transmitted over a network. In such networks, the event emitters (102) transmit one event, but the pipelines (106, 108) receive two or more events. A more concrete example of such a transport layer is a publish-subscribe system such as Apache® Kafka, which can provide "at least once" delivery of events.

As illustrated, the system (100a) routes events from the transport layer (104) to both a streaming pipeline (106) and a batch pipeline (108). In the illustrated embodiment, the batch pipeline (108) processes data in batches. As used herein, a batch refers to a period in which the batch pipeline (108) analyzes data (e.g., every hour). The disclosure does not describe the specific inner workings of the batch pipeline (108) in detail; however, the batch pipeline (108) comprises any processing system that provides accurate processing of data. Examples of batch pipelines include Hadoop clusters. The batch pipeline (108) ensures this accuracy by running slowly and at fixed intervals upon receiving all needed data. Since the batch pipeline (108) requires a fixed period of data (e.g., one hour) and a second fixed period to process the data (e.g., three hours), the batch pipelines (108) are consistently "behind" the current time. That is, when the batch pipeline (108) writes data to the data warehouse (110), the data written is "stale" by a fixed amount of time (e.g., four hours in the previous examples). However, as stated above, consumers of the batch-processed data can be confident that the data is accurate.

As a brief aside, before Lambda systems, big data systems often only included a batch pipeline (108) and did not include a streaming pipeline (106). As a result, such systems produced consistently delayed results. To remedy this delay, the system (100a) includes a streaming pipeline (106). Such a pipeline may comprise one or more stream processors such as Apache® Storm processors or similar stream processors. In contrast to the batch pipeline, the streaming pipeline (106) processes data in real-time or near real-time. Thus, when the streaming pipeline (106) receives an event over the transport layer (104), it immediately processes or transforms the event and writes the processed event to the data warehouse (110).

Since the streaming pipeline (106) processes events quickly and in isolation, the streaming pipeline (106) may introduce errors in the processed data. For example, the streaming pipeline (106) generally does not guard against writing duplicate data if the pipeline (106) receives duplicate events. Similarly, the streaming pipeline (106) may inadvertently drop some events. Thus, the streaming pipeline (106) is fast but inaccurate.

In the illustrated embodiment, the data warehouse (110) segments data received from the streaming pipeline (106) and the batch pipeline (108) into two separate storage areas. Additionally, as the batch pipeline (108) "catches up" to the data processed by the streaming pipeline (106), the data warehouse (110) overwrites the results of the streaming pipeline (108). Thus, at any given moment, the data warehouse (110) stores accurate, batch-processed data and a smaller, more recent subset of inaccurate stream-processed data. Absent system failures, the size subset of the inaccurate data remains constant while the size of the accurate data increases over time.

To support the above format of the data warehouse, the system (100a) must duplicate logic between the streaming pipeline (106) and the batch pipeline (108). Since the streaming results must be "reconciled" with the results of the batch processing, the streaming pipeline (106) and batch pipeline (108) must process the events in the same manner. This requirement doubles both the development time and the computing resources needed to support both pipelines (106, 108). Additionally, the system (100a) requires additional software and hardware to enable the data warehouse (110) to perform the reconciliation process after the completion of each batch processing job.

Figure 1B:
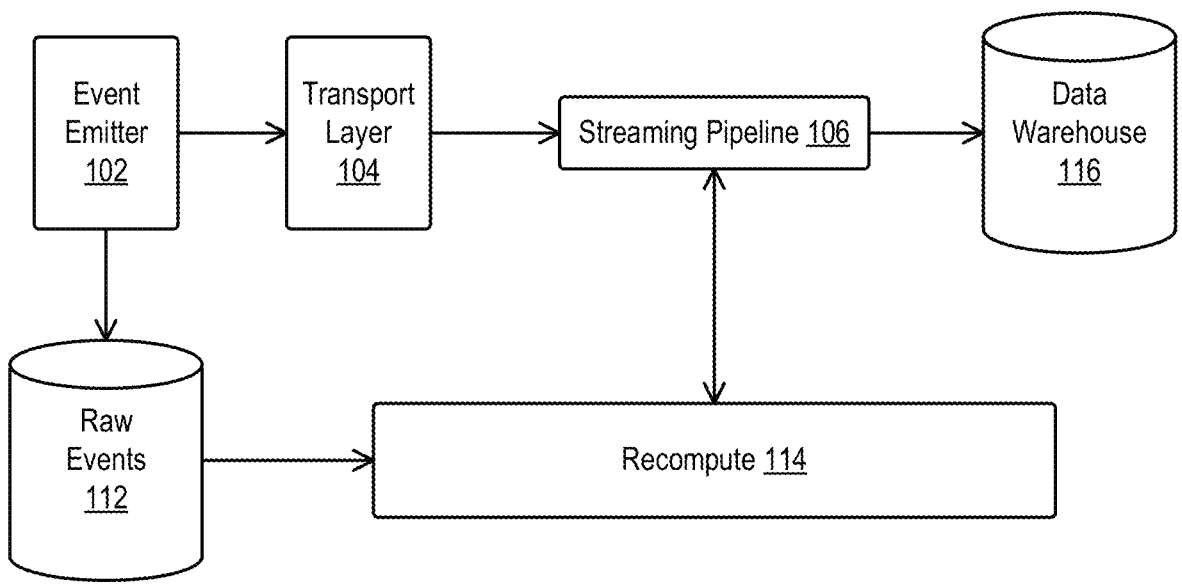
FIG. 1B is a block diagram illustrating a processing system employing a Kappa architecture.

FIG. 1B is a block diagram illustrating a processing system employing a Kappa architecture. The illustrated system (100b) solves some of the problems of Lambda architectures, as discussed in the preceding figure. However, the system (100b) introduces additional problems and fails to provide full batch support.

Various elements of the system (100b) are identical, or nearly identical, to those similarly numbered elements of FIG. 1A. The event emitters (102) and the data transport layer (104) perform the same functions as previously described. Also, the streaming pipeline (106) may perform many, if not all, of the same operations of the streaming pipeline (106) discussed in FIG. 1A.

As illustrated, the streaming pipeline (106) receives events generated by the event emitters (102) over the data transport layer (104). The streaming pipeline (106) processes this data and writes the processed data to the data warehouse (116). In contrast to the data warehouse (110) in FIG. 1A, the data warehouse (116) may only include a single storage area for data given the absence of a batch processing layer.

As described in the description of the previous system (100a), streaming pipelines (106) generally cannot guarantee the accuracy of data processing. Some systems (e.g., 100b) remedy this problem by employing "micro batching" whereby small batches of stream events are processed simultaneously. In general, these batches represent milliseconds of events, thus providing reasonable speed while simulating small batches. Micro-batching, however, fails to provide the level of accuracy provided by larger (e.g., one hour) batches. Another technique uses recompute logic (114) to re-process streaming events when the logic of the streaming pipeline (106) changes or based on other requirements. In this scenario, the system (100b) can store raw events in the raw events storage module (112), the recompute logic (114) retrieves these events. The recompute logic (114) then streams the events into the stream pipeline (106) for re-processing. In one scenario, the recompute logic (114) executes when the system (100b) changes the processing logic of the streaming pipeline (106). Thus, if the system (100b) modifies how the streaming pipeline (106) processes events, the recompute logic (114) simulates a historical event stream. In another embodiment, the recompute logic (114) can stream data from the raw events storage module (112) to the streaming pipeline (106) at fixed intervals, thus simulating a batch processing mode. However, there are numerous challenges to this approach that limit its effectiveness. First, data from the raw events storage module (112) must be re-streamed in the same order as streamed initially, to ensure the integrity of the re-processing. Thus, the recompute logic (114) reproduces inaccuracies relating to out-of-order events during the re-streaming. Second, the infrastructure that supports the streaming pipeline (106) generally cannot handle significant increases in streaming data, thus limiting the total amount of re-streamed data the streaming pipeline (106) can handle at any given time. Third, and most importantly, the streaming pipeline (106) cannot inherently perform various operations that a batch pipeline (108) can perform, such as joins or aggregations. Thus, even if re-streamed, the output of the streaming pipeline (106) always lacks these advanced operations.

Figure 2:
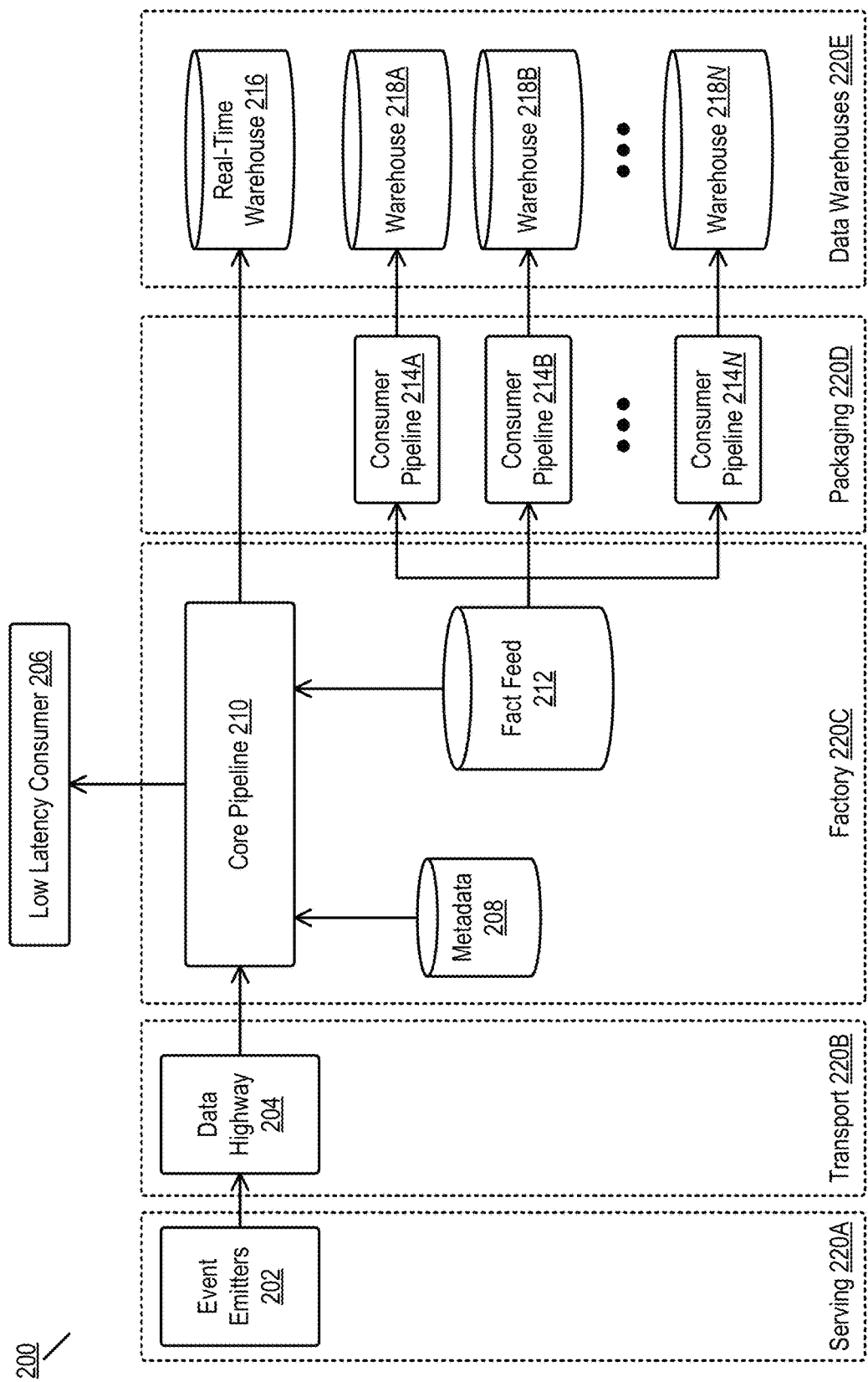
FIG. 2 is a block diagram illustrating a data processing system according to some embodiments of the disclosure.

FIG. 2 is a block diagram illustrating a data processing system according to some embodiments of the disclosure.

The illustrated system (200) segments the data processing into multiple logical layers. In some embodiments, these layers may also comprise physical layers, with each layer physically connected via a network interconnect. The illustrated layers comprise serving (220a), data transport (220b), pipeline factory (220c), packaging (220d), and warehousing (220e) layers.

The serving layer (220a) includes one or more event emitters (202). In the illustrated embodiment, these event emitters (202) can be similar or identical to the event emitters (102) discussed previously. As a few examples, the event emitters (202) can comprise systems including, but not limited to, ad servers, web servers, and beacon servers, that produce raw traffic events and send the events factory layer (220c) via the data transport layer (220b). In the illustrated embodiment, the data transport layer (220b) represents the previously described data transport (204). In the illustrated embodiment, the data transport layer (220b) comprises multiple network topologies and protocols that, when combined, deliver events to the factory layer (220c).

Figure 3:
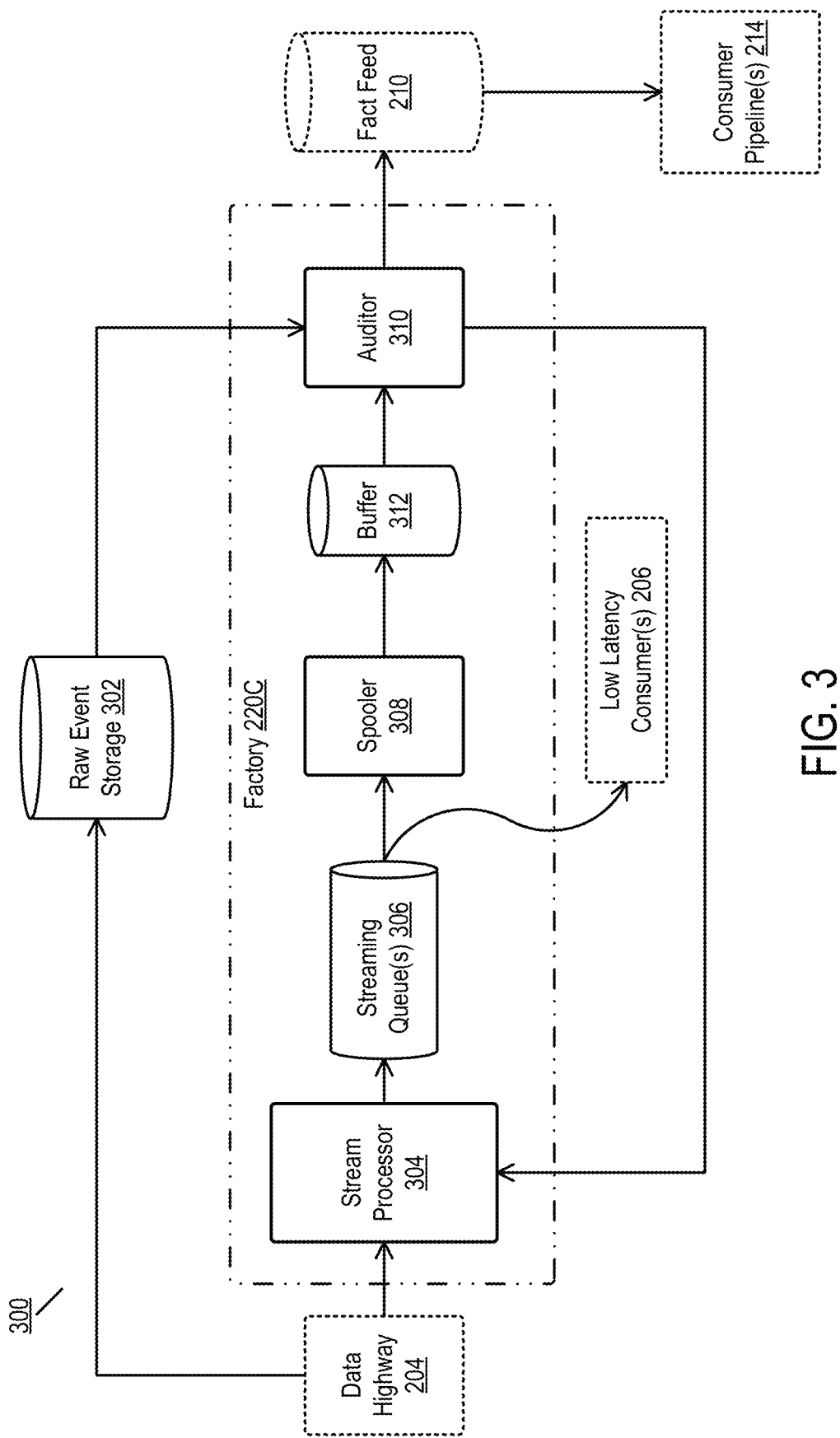
FIG. 3 is a block diagram illustrating a pipeline factory according to some embodiments of the disclosure.
Figure 4:
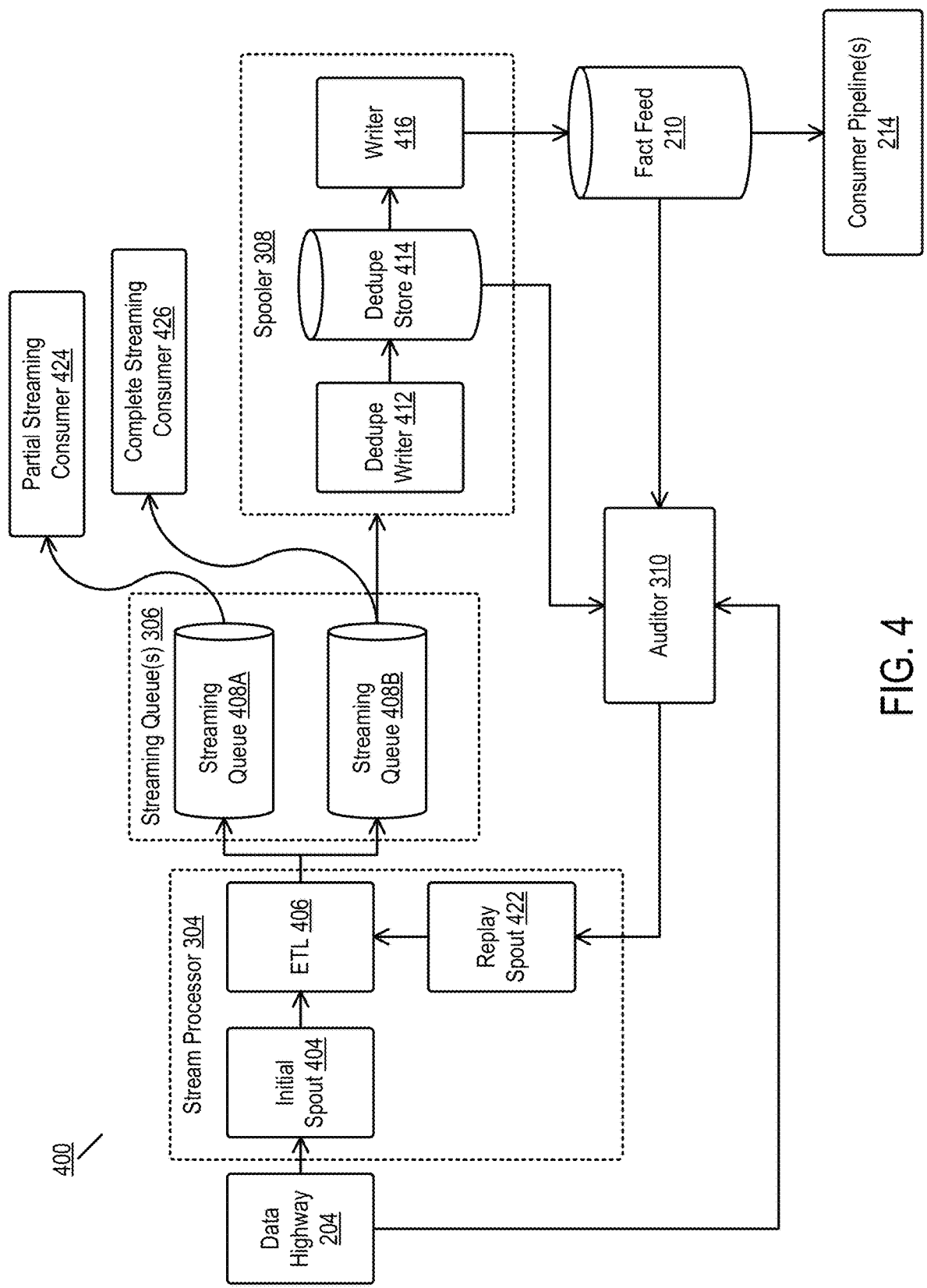
FIG. 4 is a block diagram illustrating a core pipeline according to some embodiments of the disclosure.

In the illustrated embodiment, the factory layer (220c) receives raw events from the data transport layer (220b) and processes the events via a core pipeline (210). The description of FIG. 3 provides further detail regarding the factory layer (220c), and the description of FIG. 4 provides further detail regarding the core pipeline (210). Thus, the following description of the factory layer (220c) only briefly describes the layer (220c) and the core pipeline (210), and FIGS. 3 and 4 present further detail.

The factory layer (220c) is responsible for doing the bulk of the processing of event traffic via the core pipeline (210).

The following description describes exemplary processing operations performed by the core pipeline (210). The core pipeline (210) may perform some or all of the following operations as well as additional operations.

In one embodiment, in the serving (220a) and data transport (220b) layers, devices often compress and bundle data to conserve bandwidth. As a result, the core pipeline (210) may perform a parsing operation that unpacks or processes complex data structures (e.g., blobs) so that downstream consumer systems can access the data. Thus, as one example, the core pipeline (210) can detect that an incoming event was compressed using a gzip algorithm and may first unzip the event.

In another embodiment, the core pipeline (210) performs explosion operations. An explosion operation comprises unpacking composite events. For example, a multi-serve event comprises an event indicating that an end-user device received a set of content to be displayed. Thus, the multi-serve event comprises a data structure describing multiple items of content (e.g., advertisements). The core pipeline (210) may transform a single multi-serve event into multiple single-serve events such that each item of content in the event is associated with an independent event for later processing.

In another embodiment, the core pipeline (210) performs metadata annotation operations. As illustrated, the core pipeline (210) communicates with a metadata store (208). In one embodiment, the metadata store (208) comprises a data storage device such as a MySQL database or other type of relational database. In other embodiments, the metadata store (208) may comprise other types of data storage devices (e.g., a key-value data store). The core pipeline (210) accesses the metadata store (208) to perform dimensional annotation on incoming event data. As used herein, dimensional annotation refers to the augmenting of data with additional other data. For example, a content serving event may only a line item identifier identifying the served content. The core pipeline (210) may access the metadata store (208) and look up a parent insertion order, an advertiser identifier, and an organization for that line item identifier. The core pipeline (210) may then augment the line item identifier with this metadata to generate an annotated event. In this way, downstream consumer systems can group and aggregate based on the line item identifier.

In another embodiment, the core pipeline (210) performs traffic annotations. A traffic annotation comprises a complex join of an event with a prior event. For example, a click event may need to be joined with a first impression event to annotate the click with auction information or targeting information that is only available in the first impression.

In another embodiment, the core pipeline (210) performs arbitrary computations dictated by business logic. An example of this type of computation is a currency conversion. By doing the operation only once in the core pipeline (210), the system (200) can ensure consistency across all subsequent consumer systems, rather than requiring downstream consumer systems to implement the same rules and possibly arrive at different results.

In another embodiment, the core pipeline (210) validates incoming events. In this embodiment, the core pipeline (210) can filter events based on traffic conditions.

In another embodiment, the core pipeline (210) performs deduplication on incoming events. As discussed previously, the data transport layer (220b) may support "at least once" semantics. Alternatively, or in conjunction with the preceding, event emitters may allow duplicate events. Regardless of the source of duplication, the core pipeline (210) ensures that all events are processed and stored once and not duplicated. For example, the core pipeline (210) may allow more than one click event per impression event during a given period.

In another embodiment, the core pipeline (210) performs normalization on the received events. During a normalization operation, the core pipeline (210) "fits" an event to a particular schema or layout to facilitate reporting. This schema or layout is typically a standard field alignment and transformation.

Finally, in some embodiments, the core pipeline (210) performs a fast feedback operation. In this operation, the core pipeline (210) provides feeds or streams of data at very low latency to low-latency consumers (206) such as an ad serving budget control system. Typically, most consumer systems wait until the core pipeline (210) has completed all processing steps; however, some consumer systems are willing to sacrifice quality for timing. These specialty stages can be critical to some consumer systems.

In general, the core pipeline (210) processes events linearly: the quality of the event data increases as data passes from one processing operation to the next. Ultimately, after the core pipeline (210) applies all operations to the event data, the core pipeline (210) writes the processed event to one or more fact feeds (212). In the illustrated embodiment, a fact feed (212) comprises a log of every event that was received by the core pipeline (210) and any additional information that the core pipeline (210) annotates or computes. The fact feeds (210) become the source of truth for the entire system (200). By having the core pipeline (210) compute the fact feed (212) used by subsequent consumers pipelines (214a, 214b, 214n), the overall quality of the system (200) is improved.

Since the system uses a centralized fact feed (212), the core pipeline (210) never removes any field from an event. Additionally, the core pipeline (210) does not modify any raw field that it receives from the core pipeline (210) from the data highway (204). However, as one exception, the core pipeline (210) may replace null or empty fields with a static or default value, as this may assist downstream consumer systems (214a, 214b, 214n). In most embodiments, the core pipeline (210) does not attempt to "correct" or "fix" invalid values in an event. However, the core pipeline (210) may deviate from this requirement to recover from failed launches or bugs. In some embodiments, if the core pipeline (210) violates this requirement and fixes an invalid value in an event, the core pipeline (210) annotates the record with a flag so that a downstream consumer system can monitor the rule.

Importantly, the core pipeline (210) also ensures that no event is duplicated in the final fact feed (212). Thus, the core pipeline (210) never intentionally duplicates or allows duplicate events to result from the operations.

In the illustrated embodiment, the packaging layer (220d) comprises various consumer pipelines (214a, 214b, . . . 214n) retrieve or receive data from the fact feed (212). The packaging layer (220d) accesses the fact feed (212) and provides the processed events therein to downstream consumer pipelines (214a, 214b, . . . 214n). Whereas the factory layer (220c) is typically a complex, but linear processing stage, the packaging layer (220d) is typically composed of multiple parallel consumer pipelines (214a, 214b, . . . 214n). Consumer pipelines (214a, 214b, . . . 214n) are typically minimal, possibly single-stage pipelines that project and aggregate the events in the fact feed (212) for loading into a warehouse (e.g., 218a, 218b, . . . 218n) or similar system. The availability of the fact feed (212) triggers consumer pipelines (214a, 214b, . . . 214n), and thus the consumer pipelines (214a, 214b, . . . 214n) may run in parallel with one another.

In some instances, the consumer pipelines (214a, 214b, . . . 214n) are external to the factory layer (220c) and warehouse layer (220e). In other instances, the system (200) includes and controls the consumer pipelines (214a, 214b, . . . 214n). Alternatively, or in conjunction with the preceding, the warehousing layer (220e) may be external to the system (200). In various embodiments, the consumer pipelines (214a, 214b, . . . 214n) generally perform some or all of the following operations (or combinations thereof).

In one embodiment, the consumer pipelines (214a, 214b, . . . 214n) perform mapping and transformation operations. In these operations, the consumer pipelines (214a, 214b, . . . 214n) may require the data in a format different than the format of the fact feed (212). For example, the consumer pipelines (214a, 214b, . . . 214n) may map enumerated values (possibly in a lossy fashion) to fit a further downstream consumer data model.

In another embodiment, the consumer pipelines (214a, 214b, . . . 214n) perform projection operations. In some embodiments, consumer pipelines (214a, 214b, . . . 214n) will typically not require every field of the fact feed (212). Thus, the consumer pipelines (214a, 214b, . . . 214n) only ingest a small fraction of the available columns.

In another embodiment, the consumer pipelines (214a, 214b, . . . 214n) perform aggregation operations. In some embodiments, the consumer pipelines (214a, 214b, . . . 214n) aggregate facts and produce metric fields for efficient loading into a database or similar data store.

In another embodiment, the consumer pipelines (214a, 214b, . . . 214n) perform reverse annotation joins (e.g., right outer joins). In some embodiments, the consumer pipelines (214a, 214b, . . . 214n) perform join operations that cannot be implemented efficiently within the core pipeline (210). For example, a data science consumer pipeline may require a feed containing every impression event joined to any future click events recorded in the fact feed (212). Because this type of pipeline requires data collected over a long period before processing can begin, it would negatively impact all consumer pipelines (214a, 214b, . . . 214n) to wait. Therefore, the pipeline performs these joins in batch outside of the core pipeline (210).

In another embodiment, the consumer pipelines (214a, 214b, . . . 214n) perform rollup operations. In some embodiments, the consumer pipelines (214a, 214b, . . . 214n) may choose to create rollup feeds of the raw facts stored in fact feed (212). For example, the consumer pipelines (214a, 214b, . . . 214n) may create an hourly feed from a five-minute fact feed. The consumer pipelines (214a, 214b, . . . 214n) may perform this operation to use fewer filenames in a distribute filed system (e.g., the Hadoop Filesystem, HDFS) since such a file system collapses multiple files into larger single files. Further, the rollup may typically transform the data into a columnar format like Optimized Row Columnar (ORC) to promote faster ad hoc projection.

In another embodiment, the consumer pipelines (214a, 214b, . . . 214n) perform sketch operations. In some embodiments, as the consumer pipelines (214a, 214b, . . . 214n) generate aggregates, the consumer pipelines (214a, 214b, . . . 214n) may produce aggregate sketch columns to capture unique users or similar complex computations. The consumer pipelines (214a, 214b, 214n) can perform this expensive operation once on behalf of multiple end-users or downstream systems.

In another embodiment, the consumer pipelines (214a, 214b, . . . 214n) perform cleansing operations. In some embodiments, the consumer pipelines (214a, 214b, . . . 214n) may cleanse data in the fact feed (212) for a specific purpose. For example, cookies or personally identifiable information (PII) might need to be anonymized, or the consumer pipelines (214a, 214b, . . . 214n) may need to obscure data to enforce data visibility controls.

In some embodiments, the consumer pipelines (214a, 214b, . . . 214n) can be hierarchal. That is, a first consumer pipeline may perform one or more shared steps, and downstream consumer pipelines use the output of the first consumer pipeline as input.

After processing by consumer pipelines (214a, 214b, . . . 214n), each of the consumer pipelines (214a, 214b, . . . 214n) output further processed event data to respective data warehouses (218a, 218b, . . . 218n) in the warehousing layer (220e). The warehousing layer (220e) is generally the final stage of the system (200), where data is loaded into various systems to facilitate reporting, billing, or analysis. A data team may be responsible for various aspects of the warehousing, or it may be delegated to a data customer instead. Operations for a data team include loading, replication, and verification. In loading operations, the system (200) may need to load the data into a data warehouse (e.g., an Oracle or Druid data warehouse) or place the data onto a shared drop box or similar system. In replication operations, the system (200) may need to replicate a data feed to another data processing (e.g., Hadoop) cluster in a different co-location. In a verification operation, the system (200) may need to verify that the data loaded into a warehouse (218a, 218b, . . . 218n) accurately matches the original fact feed (210) (i.e. certify there was no data loss).

As illustrated, in some embodiments, data bypasses the packaging layer (220d). In these embodiments, the core pipeline (210) streams output directly to a real-time data warehouse (216). In the illustrated embodiment, the real-time data warehouse (216). In the illustrated embodiment, the system (200) may use a real-time data warehouse (216) for reporting or similar functions that do not require high data accuracy.

FIG. 3 is a block diagram illustrating a pipeline factory according to some embodiments of the disclosure.

In the illustrated embodiment, a data highway (204) delivers events from one or more event emitters (not illustrated) to a factory layer (220c) and raw event storage (302). The description of FIG. 2 provides further detail regarding the data highway (204) which is not repeated herein.

In the illustrated embodiment, the raw event storage (302) may comprise a distributed file system (e.g., HDFS). In one embodiment, the system (300) writes raw events to the raw event storage (302) as they are received. In some embodiments, the system (300) writes the raw events to raw event storage (302) in a batch mode. That is, the system (300) writes a separate file for each batch period (e.g., one hour), the file including all events received during that period. In some embodiments, not illustrated, external consumer systems can access the raw event storage (302) to perform batch processing. Thus, in some embodiments, the raw event storage (302) can be used to provide backwards compatibility with existing batch pipelines.

As illustrated, a stream processor (304) receives events from the data highway (204). In one embodiment, the stream processor (304) comprises a distributed stream processor. In one embodiment, the stream processor (304) comprises a streaming topology that defines data processing stages to perform on events.

One example of a stream processor (304) is an Apache® Storm topology. Briefly, a Storm topology is a graph of inputs and processing nodes. The topology receives events as input streams. Each event in the input stream comprises a tuple and the input stream itself is an unbounded series of such tuples. The topology receives streams from input sources, referred to as "spouts." The topology performs all processing in individual processing nodes, referred to as "bolts." The topology defines the input to a bolt as either a spout or another bolt. Thus, the topology defines connects between spouts and bolts. The output of one or more bolts forms the output of the topology.

In the illustrated embodiment, the stream processor (304) performs any or all of the processing operations described in the description of core pipeline (210) in FIG. 2. Details of these operations are not repeated herein. Importantly, the stream processor (304) ensures that a given event received over the data highway (204) is output at most once to the streaming queue(s) (306). Thus, during processing, the stream processor (304) detects and drops any duplicated events. FIG. 4 provides further detail regarding specific techniques for performing this detection and dropping.

As illustrated, the stream processor (304) outputs the processed and de-duplicated event stream to one or more streaming queues (306). In one embodiment, the streaming queues (306) comprise one or more Apache® Kafka queues. Since the event stream is processed by the stream processor (304), the data stored in the streaming queues (306) can be considered as source of truth for downstream consumers. Thus, a low-latency consumer system (206) can directly access the streaming queues (306). In this manner, the system (300) can simulate a fully streaming pipeline. As will be discussed, since the stream processor (304) processes the event stream and ensures that no records are dropped or duplicated, the simulated stream in the streaming queues (306) is more accurate than a raw event stream. Furthermore, as will be discussed, the output of the stream processor (304) includes the results of more complicated or advance operations (e.g., joins or dimensional annotation) which are not possible using traditional stream processing techniques.

A spooler (308) and auditor (310) use the output of the stream processor (304) to support advanced operations by the stream processor (304). FIG. 4 provides more detail regarding the spooler (308) and reference is made to that description.

In one embodiment, the spooler (308) comprises a second stream processor. The spooler (308) ensures that a one-to-one mapping between streamed data and data written to the fact feed (210) exists. The spooler (308) also ensures that streaming events retrieved from the queues (306) appears exactly once in the fact feed (210) (i.e., no events in the queues, 306, are duplicated). As such, the spooler (308) may comprise a separate stream topology similar to the stream processor (304). In contrast to the stream processor (304), the spooler (308) reads events from the streaming queues (306). Thus, the event stream to the spooler (308) comprises the processed events. As illustrated, prior to writing to the fact feed (210), the spooler (308) outputs to the auditor (310) via a buffer (312). In one embodiment, the output of the spooler (308) comprises a flat file (e.g., an HDFS file) and the buffer (312) comprises a distributed file system such as HDFS. In one embodiment, this flat file comprises a set of events occurring in a given batch period. Thus, the flat file simulates batch processing, but using the streaming events.

In the illustrated embodiment, an auditor (310) receives the output of the spooler (308). As described above, in some embodiments, the output of the spooler (308) comprises a batch file of events. In the illustrated embodiment, the auditor (310) also accesses raw event storage (302). In one embodiment, the format of the raw event storage (302) and the output of the spooler (308) are the same. For example, spooler (308) may write flat files to HDFS buffer (312) and raw event storage (302) may comprise raw events stored in the same type of file (e.g., HDFS). In the illustrated embodiment, the auditor (310) retrieves a batch file from buffer (312). In one embodiment, this batch file is associated with a fixed period. In some embodiments, this fixed period is represented in the filename or in metadata. Using this fixed period, the auditor (310) then retrieves a set of events from the raw event storage (302) matching the fixed period. In one embodiment, the periods of the buffer (312) and the raw event storage (302) are synchronized. In this embodiment, the auditor (310) then retrieves a single file from the raw event storage (302) that matches the period pulled from the buffer (312). In other embodiments, the auditor (310) may execute a MapReduce job to identify events split across multiple files. In this embodiment, the periods represented by files in the raw event storage are not synchronized with the buffer (312). Thus, the auditor (310) must patch together portions of multiple files stored in raw events storage (302) to rebuild a period of raw events matching the period stored in the buffer (312). In either event, the auditor (310) receives two files containing raw events from raw event storage (302) and a set of processed events for the same period stored in buffer (312).

In general, the auditor (310) ensures that each processed event in the buffer (312) matches a raw event stored in raw event storage (302). Thus, the auditor (310) ensures that no events were dropped during processing by the stream processor (304) and that no events were duplicated. If the auditor (310) detects that an event exists in the raw event storage (302) and does not exist in the corresponding buffer (312) output, the auditor (310) sends the missing event back to the stream processor (304) for re-processing.

The stream processor (304) reprocesses the events using the same processing logic used to process the event originally. In some embodiments, the stream processor (304) may add a field to the reprocessed event to indicate it was (or will be) reprocessed. In most embodiments, the stream processor (304) will properly process the event during re-processing. However, if the stream processor (304) cannot reprocess the event (as detected by the auditor, 310), the system (300) may gracefully handle the error. In one embodiment, the auditor (310) can itself add a field to the raw event indicating that the raw event was not processed and write the event along with the processed events.

After any missing events are re-processed, the auditor (310) writes the final output to the fact feed (210). Since spooler (308), buffer (312) and auditor (310) operate on batches of events, the fact feed (210) comprises a simulated batch data store. In some embodiments, the auditor (310) will delay writing to the fact feed (210) until any events are re-processed. In other embodiments, the auditor (310) writes the partially final output file to the fact feed (210) and updates the file upon completing the re-processing.

FIG. 4 is a block diagram illustrating a core pipeline according to some embodiments of the disclosure. Various elements of FIG. 4 are described in the previous figures and those elements are not described again herein.

In the illustrated embodiment, a stream processor (304) receives events from a data highway (204). In the illustrated embodiment, the stream processor (304) receives events from the data highway (204) via an initial spout (404). The stream processor (304) as illustrated includes two separate spouts (404, 422). In the illustrated embodiment, the stream processor (304) utilizes two spouts (404, 422) to distinguish between event streams (e.g., original versus re-processing). In the illustrated embodiment, the stream processor (304) topology can be configured to add additional extract-transform-load (ETL) steps (e.g., bolts) for the reprocessing spout (422) versus events received via the initial spout (404).

In the illustrated embodiment, the stream processor (304) processes events received via spouts (404, 422) via ETL logic (406). As described previously, ETL logic (406) may comprise a series of linear processing stages (e.g., bolts) for each operation performed on events.

In the illustrated embodiment, the ETL logic (406) outputs processed events to two streaming queues (408a, 408b). In one embodiment, the two queues (408a, 408b) store varying types of event data. As illustrated, a first queue (408a) is accessed by a partial stream consumer system (424). In the illustrated embodiment, the first queue (408a) may be filled by the ETL logic (406) prior to the execution of all processing steps. In the illustrated embodiment, the ETL logic (406) may eschew more complicated and time-consuming operations and interrupt the full processing steps to provide low latency operations. In some embodiments, this bypassing includes foregoing joins, traffic protection, annotation, etc. In the illustrated embodiment, the partial stream consumer system (424) may comprise a fast feedback system such as budget or pacing systems that are willing to accept a certain level of error. Thus, the first queue (408a) provides "best effort" data wherein the system (400) does not guarantee the accuracy of the data. In practice, however, the system (400) will generally process a large amount of data correctly enough that the best effort data in the first queue (408a) is of value to the partial stream consumer system (424).

In contrast to the first queue (408a), the stream processor (302) fills the second queue (408b) with the results of the full ETL processing. Thus, the ETL logic (406) fully processes the data in the second queue (408b), including performing joins, deduplication, annotations, fraud detection, traffic protection, etc. In one embodiment, the complete streaming consumer system (426) access second queue (408b) can retrieve data that achieves close to exactly once performance (that is, no events are dropped or duplicated) since the data was fully processed in the ETL logic (406). In some embodiments, this performance will meet "exactly once" performance. However, in other embodiments, the output of the second queue (408b) is still subject to inaccuracies caused by the underlying messaging queue. In some embodiments, a near exactly one completeness from second queue (408b) comprises a 99.9% guarantee of completeness. Such a confidence level is often suitable for applications such as real-time reporting.

Finally, as illustrated and discussed above, a final fact feed (210) meets exactly once requirements of all systems and provide batch-like performance. That is, data in the fact feed (210) will be fully de-duplicated and ensure that no events were dropped. As discussed in FIG. 3, this guarantee is implemented via spooler (308) and auditor (310). Auditor (310) is described more fully in FIG. 3 and those details are incorporated herein by reference.

In the illustrated embodiment, the spooler (308) is illustrated as including deduplication writer (412), deduplication store (414), and a fact feed writer (416).

In the illustrated embodiment, the deduplication writer (412) receives events from the second queue (408b). An event is uniquely identified by an event identifier (event id).

The spooler (308) considers two events as duplicates if they have the same event identifier. Events may include additional, but standardized, fields such as a type, timestamp, join status, and secondary event identifiers.

The deduplication writer (412) writes each of the events to deduplication store (414). In one embodiment, the store (414) comprises a database such as HBase or a similar storage device. Upon receiving an event, the writer (412) analyzes the fields associated with the event. If the event includes one or more secondary event identifiers, the writer (412) will retrieve all events stored in store (414) matching these secondary event identifiers and update the entries to indicate that a primary event is available (i.e., will be written to the store, 414). The writer (412) will then write the received event to the store (414) using the event identifier as a key. In some embodiments, a salt will be added to the event identifier before using the event identifier as a key. In the illustrated embodiment, the writer (412) will not write the event if the event has secondary event identifiers and the initial step of updating the secondary events is not successful. In some embodiments, the writer (412) will serialize the event prior to writing the event as a value for the event identifier key.

In the illustrated embodiment, the deduplication store (414) stores events per batch period and per type of event. In some embodiments, the store (414) creates a new table for each event type and batch period pair for a fixed period of time (e.g., one week) since the current time. The store (414) additionally includes a pruning process that periodically inspects the created tables and removes older tables not occurring within the current period (e.g., older than one week). In some embodiments, the auditor (310) initiates this pruning process upon confirming that all data for a given period is certified.

The spooler (308) additionally includes a fact feed writer (416). In the illustrated embodiment, the fact feed writer (416) waits for a signal from auditor (310) to trigger a spooling process to write the events in the store (414) to the fact feed (210) for a particular batch period and event type. In one embodiment, the fact feed writer (416) includes an internal web server that comprises a Hypertext Transfer Protocol (HTTP) endpoint that is called by the auditor (310) to initiate the spooling. As described above, once the auditor (310) confirms that the data in the store (414) is fully processed and certified, the auditor (310) issues a call to the endpoint which causes the writer (416) to start writing to the fact feed (210). In one embodiment, the writer (416) executes a distributed process routine to per from a full table scan of the store (414) and write the events to the fact feed (210).

For each event in the store (414), the writer (416) will deduplicate the events prior to writing. In one embodiment, the writer (416) will first determine if an event has one or more secondary identifiers and whether that secondary event was successfully joined to the event under inspection. If so, the writer (416) will select the most recent secondary event and write that joined event to the fact feed (210). Alternatively, if the event under inspection indicates that a primary event is available, the writer (416) will skip the event (since a root event exists). Finally, if the event does not have secondary identifiers and the primary event flag is not raised, the writer (416) will write out the event as failed since the secondary event was not properly joined.

In some embodiments, low-latency consumers may not want to or be able to consume a low-latency stream (408a) directly. For example, the stream might contain personally-identifiable fields that need to be restricted to specific consumers or the final consumer may need additional processing of events for their use. As another example, the consumer may be consuming from many sources and is unable to handle different event schemas of their various inputs. In these scenarios, the system (400) provides derived low-latency streams, or "filters", that have all of the events (or at least all of the desired events) as the second queue (408b) stream. Each filter can be associated with a quality of service (QoS) level. In the illustrated embodiment, three QoS levels are provided: "at least once", "at most once", and "at least once with tag."

A filter having an at least once QoS outputs every event but potentially includes duplicates. In the event of a system (400) failure, the at least once filter resends previously-sent events. A filter having an at most once QoS does not include duplicates but potentially drops data. The at most once filter does not reprocess the same event batch more than once.

Finally, a filter having an at least once with tag QoS generates batch dataset wherein each event in the batch includes tags allowing downstream consumer systems to detect duplicates. In one embodiment, this filter includes a stream topic, partition, and a "cursor," that can be used to detect duplicates. In some embodiments, Kafka offsets and CMS Message Ids could provide such cursors. The consumer system is then responsible for keeping track of the last cursor it processed, and discard any subsequent batch with a cursor less than or equal the new batch. This requires a 1-to-1 correspondence between batches in the pipeline and derived streams.

Each of the above filters may be implemented via a separate stream processor (e.g., stream topology). In these embodiments, the filters utilize an output of the system (400) (e.g., queues 408a, 408b) as an input source (e.g., spout) and output the filtered feed.

For the at least one filter, the filter will always back up in the event of a failure and resend any events that cannot be confirmed as being successfully delivered. This filter uses the initial spout (404) and streaming queue (408b) as inputs (e.g., filter spouts). In this embodiment, the consumer is configured to not report its current read offset. When sending data, the filter spout includes the current events cursor in a message identifier. The receiver (e.g., sink) would then acknowledge the received message only after successfully delivering the filtered output to the derived stream. In some embodiments, the receiver could also use the existing spooler logic to fail a tuple if it can't deliver it, and then continue to fail subsequent tuples until it receives a restarting indication from the spout. Upon receipt of an acknowledgement, the filter spout would commit that cursor back to the system (400). On receipt of a fail of a sent event, the filter spout would back up the received offset to a cursor at or before the last acknowledged event and restart sending.

For the at most once filter, the filter spout enables automatically committing offsets in a stream queue. By turning on auto-commitment, the filter spout only transmits a given event once and does not re-transmit events causing duplication.

For the at least once with tag filter, the at least one filter mechanism can be used. However, in this filter, tags will be added prior to transmission to the consumer. These tags include the cursor, as described above, but also a topic and partition if they aren't implied by the derived stream's partition.

In some embodiments, an exactly once filter may be implemented based on the at least once with tag filter. In this embodiment, a receipt acknowledgement message can be saved as reliably as the system (400) can support. Additionally, the filter, on receipt of the acknowledgement, could update some persistent record of the delivered cursor. However, persisting this data may be computationally expensive and require significant storage. In an alternative embodiment, given the at least once with tag filter, the filter, on a start-up or after a failure, can access the output stream and read back a plurality of last-sent messages in the queue. The filter could then determine the tag of the last message written, then discard any replayed events from the spout until it was caught up, thus ensuring exactly once delivery.

Figure 5A:
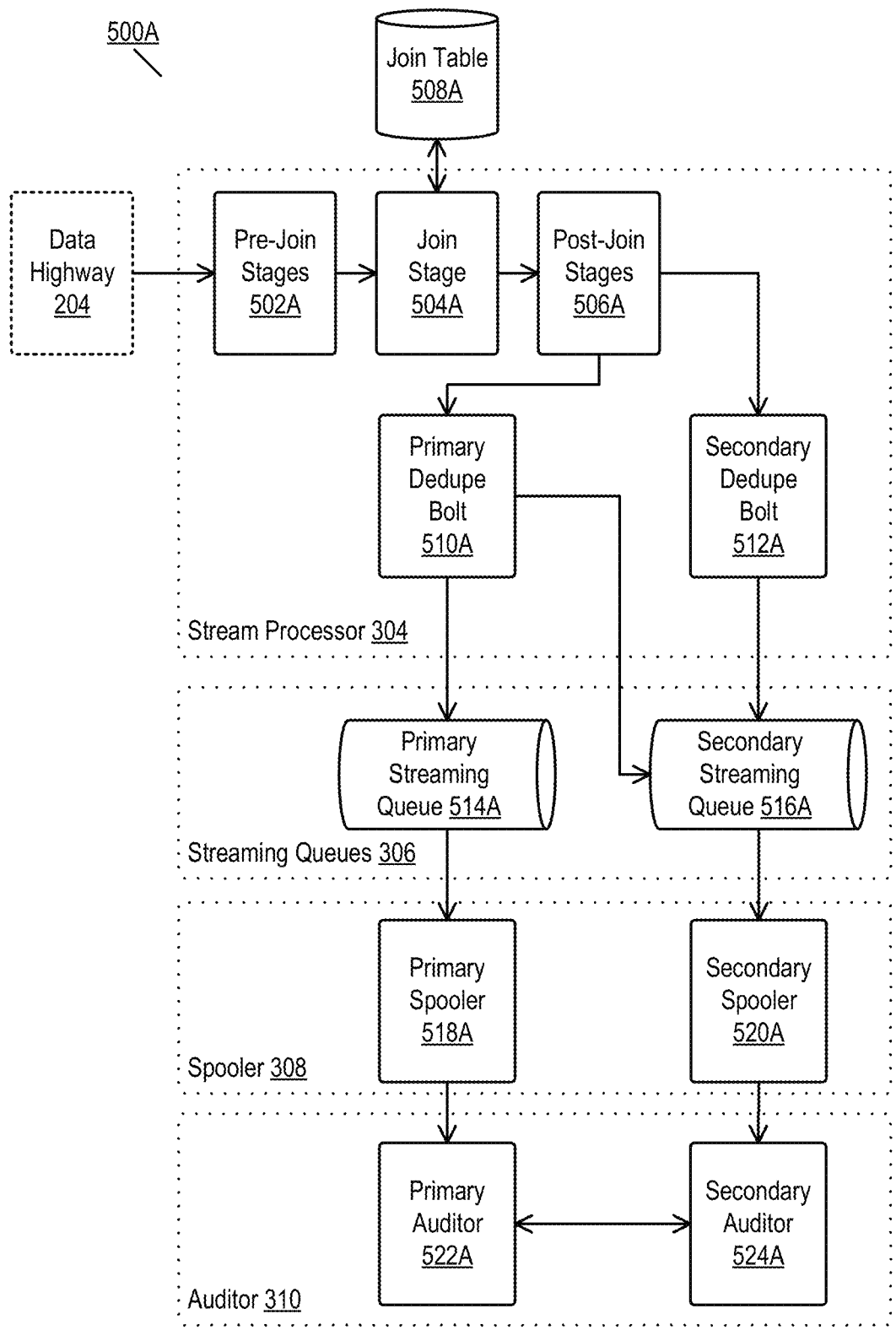
FIG. 5A is a block diagram illustrating a streaming pipeline with support for join operations according to some embodiments of the disclosure.
Figure 5B:
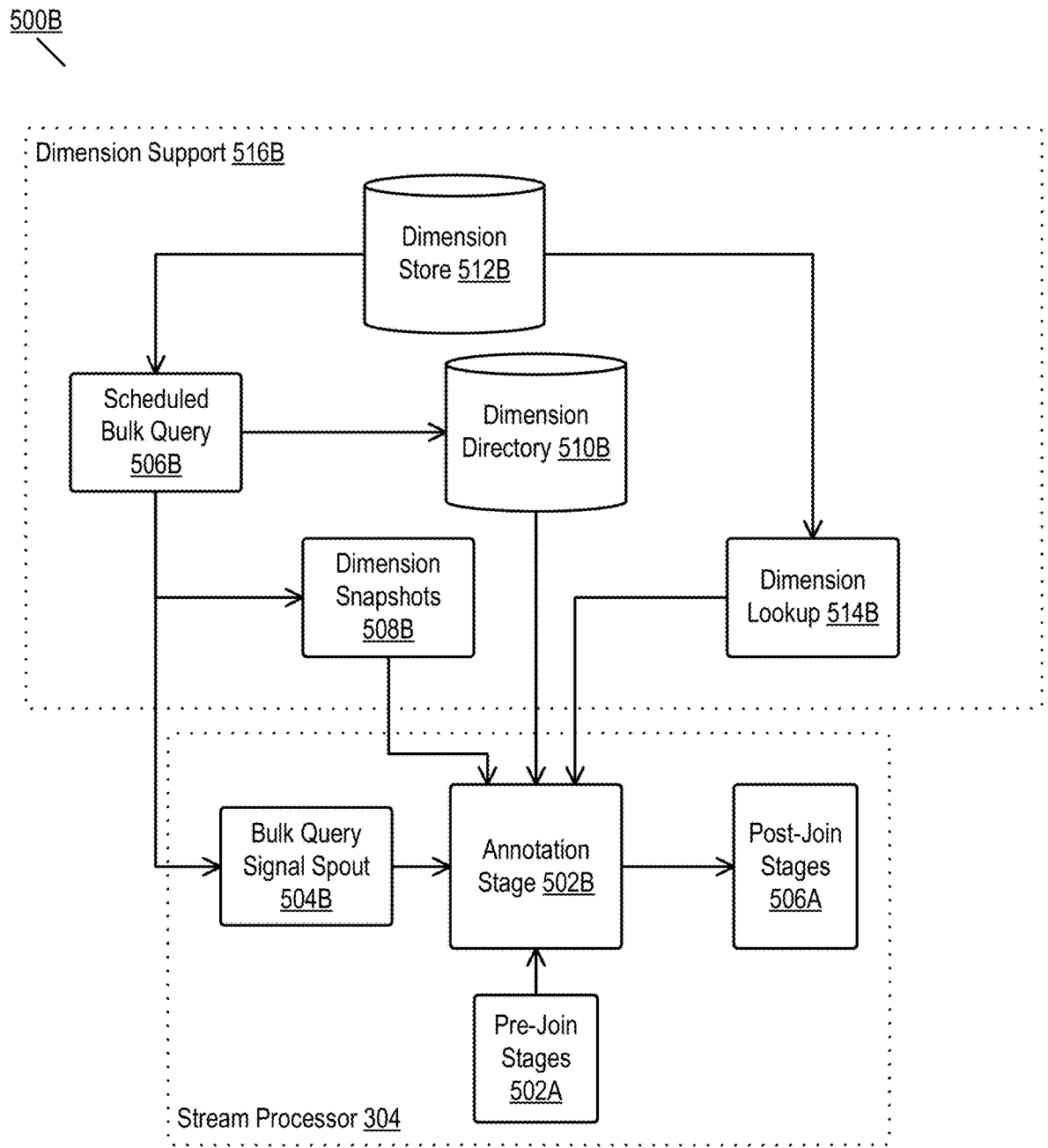
FIGS. 5B and 5C are block diagrams illustrating streaming pipelines with support for dimension annotation operations according to some embodiments of the disclosure.
Figure 5C:
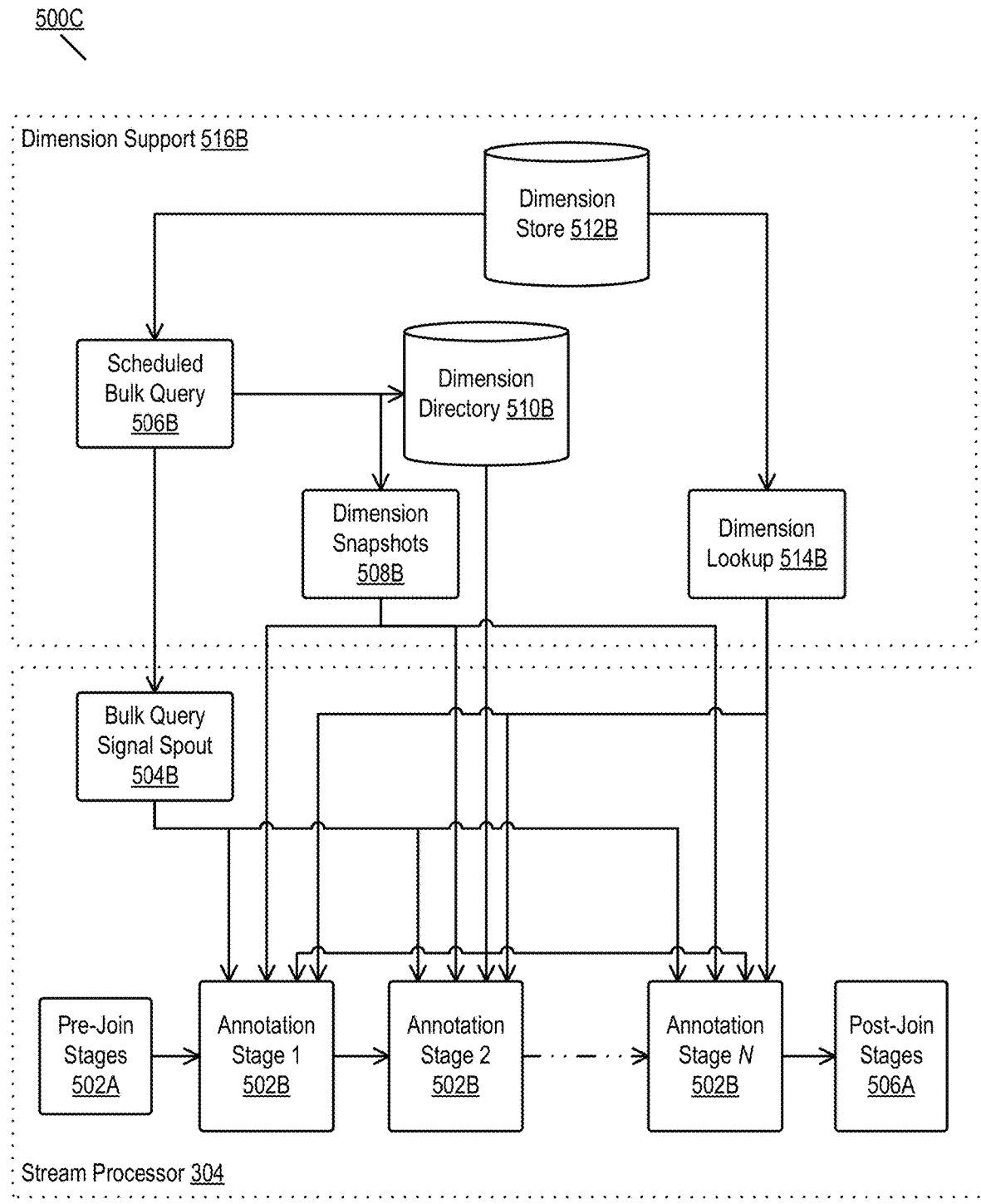
Figure 6A:
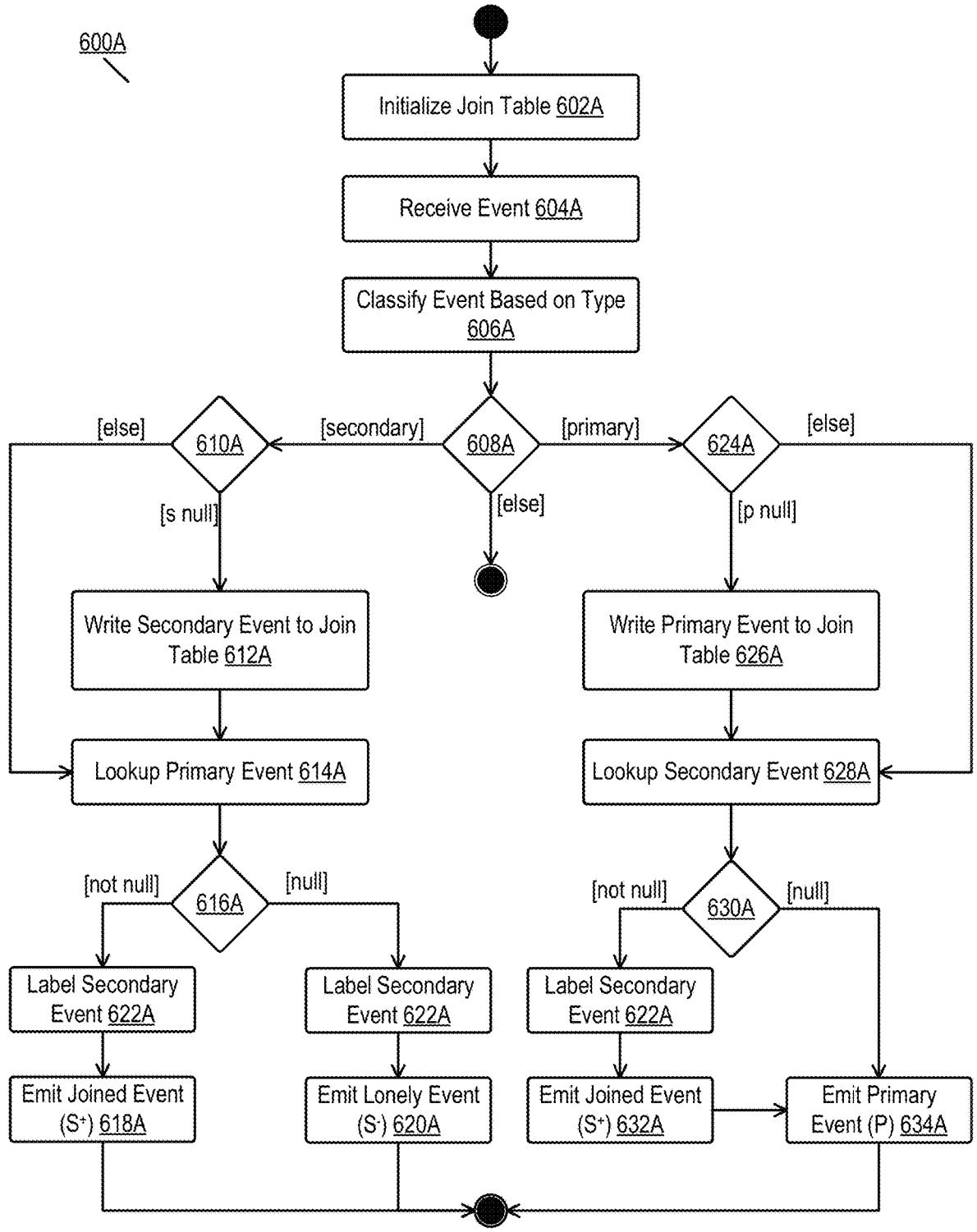
FIG. 6A is a flow diagram illustrating a method for processing joins in a streaming processor according to some embodiments of the disclosure.
Figure 6B:
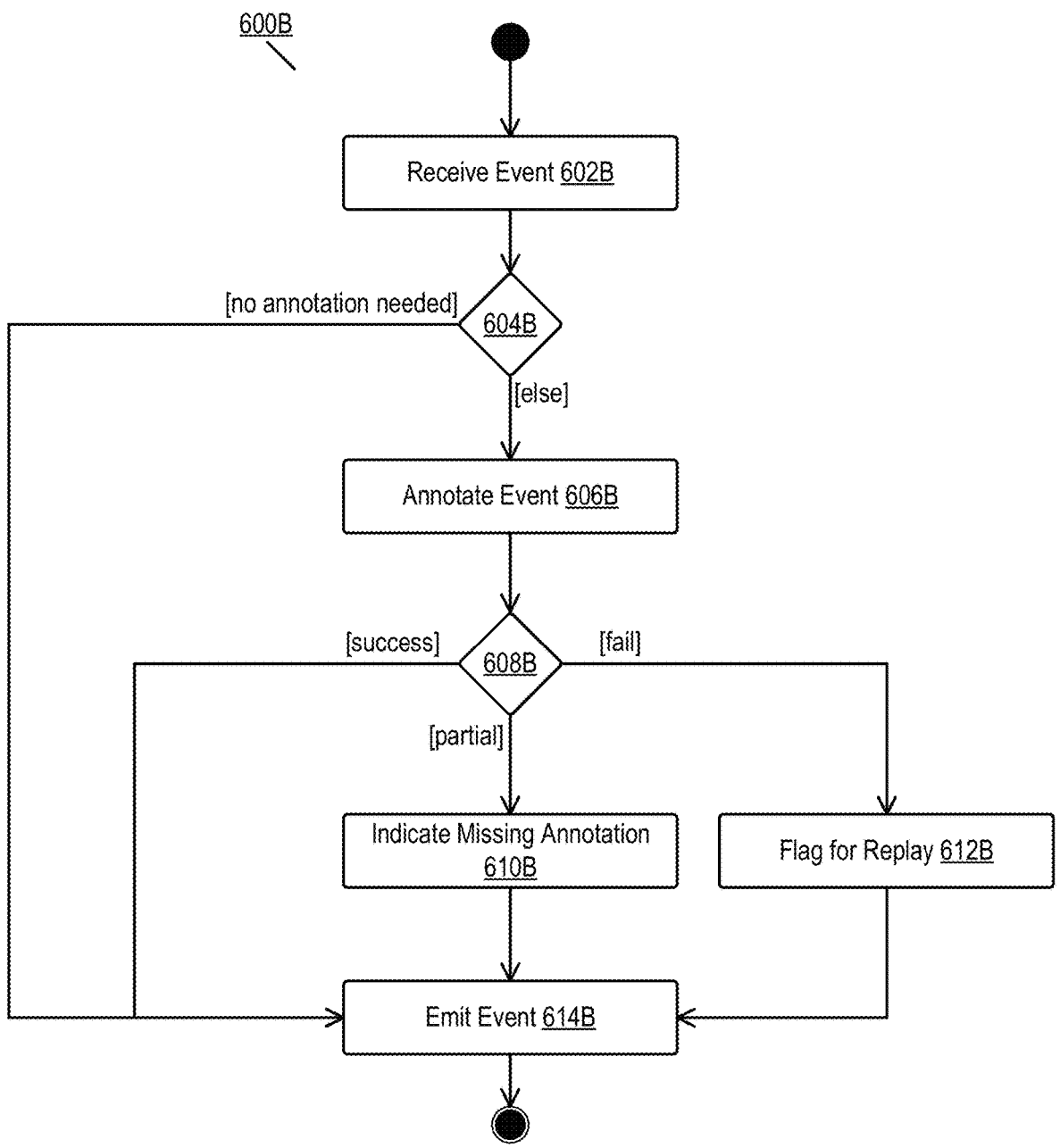
FIG. 6B is a flow diagram illustrating the annotation of an event in a stream processor according to some embodiments of the disclosure.
Figure 6C:
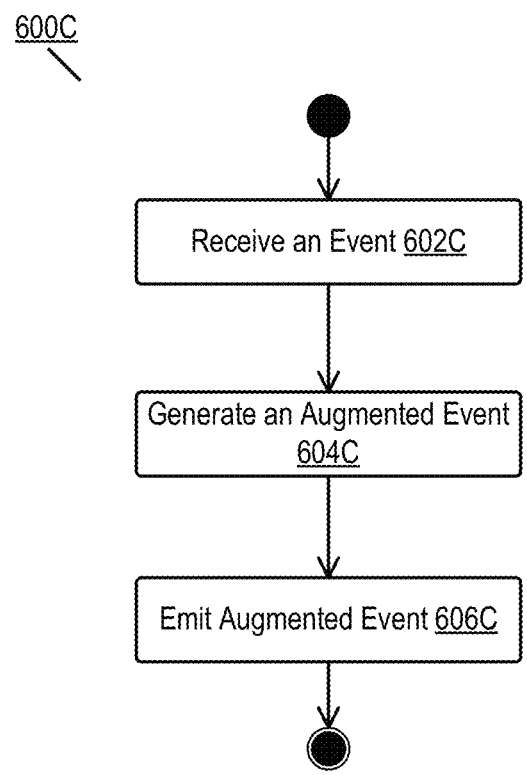
FIG. 6C is a flow diagram illustrating a method for processing an augmented event according to some embodiments of the disclosure.

FIG. 6C is a flow diagram illustrating a method for processing an augmented event according to some embodiments of the disclosure. Numerous details of the method (600c) are described more fully herein. In brief, the method (600c) describes receiving an event in step 602c. In one embodiment, the event is received by a stream processor and comprises a raw event from a data highway. In step 604c, the method (600c) generates an augmented event. In some embodiments, an augmented event comprises a joined or dimensionally annotated event generated using one or more of a join or dimension annotation operation. Details of these operations are provided in FIGS. 6A and 6B, respectively as well as FIGS. 5A through 5C. In general, the join or dimensional annotation operation will add one or more fields to an event. In step 606c, the method (600c) then emits the augmented object to a downstream consumer (e.g., a streaming queue) for further processing by a streaming pipeline, as described above. As described previously, existing stream processors generally cannot perform join or dimensional annotation operations. The following disclosure describes the technical solutions to enable these operations in a purely streaming pipeline.

As described above, a join operation is the combination of two events into a single joined event. A prototypical example of a join operation would be a Click to Serve Join (or Click to Impression join). In this example, a serve represents the event of a digital advertisement being requested for display on a web page or mobile application. In this case, the serve event will contain all of the relevant request level information that details why a particular advertisement was chosen. Meanwhile, the click event is relatively thin, containing only a few instrumented headers and values, but most importantly, containing a "join key" shared exclusively with the original serve event. The ETL operation then, is to produce click events that are annotated with all the juicy details from the corresponding serve.

In batch pipelines, the primary concern is the amount of time lag that can occur between the two events, as the batch system must index or read data over that time period. A streaming system however, must also consider the order in which events occur. This is because a batch system can perform the join after a close of books (COB) has been signaled for both the serve and click event feeds. In contrast, streaming pipelines do not have the luxury of waiting. Unless the event emitter (e.g., an ad server) and transport system (e.g., data highway) can guarantee absolute ordering over time, the possibility exists that the click may be queued into the pipeline before the serve. For some pipelines, the loss of join annotation may be acceptable for the low probability out-of-order case. But for large revenue generating systems, the loss of a join annotation could result in a financial loss, in which case, a streaming pipeline will need to handle the situation as accurately as possible.

Although the click-serve join is the classic case, another term for this type of procedure is called sessionization. Sessionization refers to the alignment of one or more secondary events to a given initial event. In audience pipelines, this might mean tracking the page navigation from the first time a user visits a site. Another example where sessionization is implemented is video ads. In a video ad use case, the point that the ad starts playing may be joined with the point the ad reaches the middle, and the point at which the ad completes playing. Generally, and as used herein, the primary event refers the initial event that declares the join key, and the secondary event is the event that needs to be annotated with the primary event that shares the same join key.

Whenever a join operation occurs, there is a concept of a join window. Unless a pipeline has infinite memory, it will always be impossible/impractical to join two events if there is extreme time lag between them. For simplicity, the join window is usually measured in term of batch windows, rather than absolute time.

Given the set $\{P\}$ of all primary events across the join window and the set $\{S\}$ of secondary events in the same join window, an accurate pipeline should produce the set $\{S'\}=\{S+\}\cup\{S^-\}$ of all annotated and unannotated secondary events. The set $\{S\}$ and $\{S'\}$ should be equal in size, each representing every secondary event in the current join window. The two subsets of $\{S'\}$ should be non-overlapping and the set $\{S+\}$ should contain all possible joins between $\{P\}$ and $\{S\}$. Thus, for every secondary event s considered part of the join window, if there exists a valid primary event p for joining within the join window, then the pipeline should annotate it $s^+$. If no such primary event exists, then the secondary event $s^-$ is considered lonely and should be unannotated and placed in subset $\{S^-\}$. As an added measure of success, the events in $\{S+\}$ should be produced in a greedy fashion, specifically, the downstream consumers should not have to wait for the COB in order to receive the elements of $\{S^+\}$. Downstream consumers may wait until COB for the lonely secondary events, as the pipeline is not able to determine if a secondary event is lonely until all primary events have been accounted for.

For example, suppose that a pipeline produces three impressions (A, B, and C) in a 24-hour period. Furthermore, impression A will have unique id a, B will have unique id b, and C will have unique id c. Then in this case $\{P\}=\{A, B, C\}$. Suppose that in addition, the pipeline receives two click events, X and Y with unique ids x and y respectively. Click event X shares join key a and click event Y shares join key d. This then implies that $\{S\}=\{X, Y\}$. Because click X joins back to A, the pipeline is expected to produce the fully annotated event $X^+$ to downstream customers. Thus, the pipeline should produce $\{S^+\}=\{X^+\}$. Since click Y points to a primary event with unique id d, and d is not in the primary set P, then Y is expected to be lonely, and thus $\{S^-\}=\{Y^-\}$. Thus, leaving $\{S'\}=U \{Y^-\}=\{X^+, Y^-\}$. If the pipeline were to fail to join X back to A and produced the set $\{X^-, Y^-\}$, then this would be considered a failure.

The above conditions for success allow for a few undefined or uncaught annotations due to late arriving events. For example, if a primary event p were to show up after the close of books for primary events has occurred, there is no explicit requirement that the pipeline must correctly annotate any secondary event s that may be tied to p. The pipeline may produce either $s^+$ or $s^-$ in this case (but not both, as that would be a duplicate) and will still be considered successful. It should be noted that batch pipelines are also not held to this standard, as the batch join would not consider any late arriving events at all. So in the previous example, if event D with join key d were to be delivered to the pipeline after the close of books has occurred on the impression events, the pipeline could potentially produce either $\{X^+, Y^-\}$ or $\{Y^+, Y^-\}$. Either would be acceptable since impression D was late and not considered part of the closed set of primary events. The disclosed embodiments handle joins using a distributed database (e.g., Apache® HBase) and thereby meet the above requirements.

FIG. 6A is a flow diagram illustrating a method for processing joins in a streaming processor according to some embodiments of the disclosure.

In step 602a, the method (600a) initializes a join table. In some embodiments, the join table comprises a table for a given join type. In one embodiment, the table is initialized in a distributed database. In the illustrated embodiment, the join table includes a key definition comprising a join key and one or more columns in the table, each column associated with an event that includes the join key. While described as a join table, the table may also be used for sessionization and in these embodiments is referred to as a session table. As an example, the click to serve join would include a join key column, a click column, and serve column.

In step 604a, the method (600a) receives an event. As described above, an event may comprise an event emitted by an event emitter, delivered over a data transport (e.g., data highway), and processed by one or more processing nodes of a stream processor prior to being received by the method (600a). The illustrated method (600a) may be performed by one or more nodes of the same stream processor and may output its results to other nodes of the stream processor. As will be discussed, an event may be a primary or secondary event.

In step 606a, the method (600a) classifies the event based on an event type and in step 608a, the method (600a) branches based on this classification. In some embodiments, the event type is stored in the header of the event. The classification may be made based on the columns of the join table or may be specified in the programming of the stream processing node. Continuing the previous example, the method (600a) may extract the event type header and classify "click" events as secondary and "serve" events as primary events. As illustrated, if the event type is not associated with a join, the event may bypass processing and be emitted by the method (600a) without further processing. In other embodiments, however, an upstream (i.e., preceding) processing node may filter events not requiring a join and thus the method (600a) may never receive an event that should not be joined.

If the method (600a) determines that a secondary event was received, the method (600a) processes the secondary event in steps 610a through 622a. Alternatively, if the method (600a) determines that a primary event was received, the method (600a) processes the primary event in steps 624a through 634a.

In step 610a, the method (600a) queries the distributed data to determine if the event exists in the join table. In the illustrated embodiment, the method (600a) extracts the join key in the event and looks up the row matching the join key and determines if the column associated with the secondary event is null.

In step 612a, the method (600a) writes the event to the join table if the event is not in the join table. Specifically, the method (600a) inserts some or all the event data into the join table for the join key. In one embodiment, the only reason the secondary event would not be in the join table is if this is a replay or similarly duplicated event, in which case, there is no reason to write a second time to the distributed database.

In step 614*a*, the method (600*a*) looks up the primary event in the join table. In some embodiments, this lookup may be performed as part of step 610*a*, when the distributed database is queried.

In step 616*a*, the method (600*a*) determines if the primary event column for the join key of the secondary event is null. In the illustrated embodiment, this check is identical to the step in 610*a*, albeit for the primary column.

In step 618*a*, the method (600*a*) emits a joined event if the primary event is present. In this case, the secondary event was received after the primary event and thus an in-order join can be performed. In the illustrated embodiment, the method (600*a*) executes the join logic on the secondary and primary events to annotate the secondary event with one or more fields from the primary event.

Alternatively, in step 620*a*, the method (600*a*) emits a lonely secondary event if the primary event is not present. In this scenario, the secondary event was received prior to primary event and thus the secondary event is either out-of-order (if the primary event appears) or permanently lonely (if the primary event never appears). Thus, when a secondary event arrives and is not immediately joinable, the method (600*a*) emits the event un-joined. The primary reason for emitting an un-joined event is that such an operation ensures data completeness and allows for replay semantics and COB in a streaming pipeline. Additionally, join operations are not guaranteed. Not every click will successfully join back to a serve in the real world. Thus, un-joined clicks themselves can be useful for counting by downstream consumers As illustrated, in step 622*a*, the method (600*a*) labels the secondary event based on the branch in 616*a* and before emitting the event in step 618*a* or 620*a*. In the illustrated embodiment, labeling the secondary event comprises setting a join status header field of the secondary event. The join status field will allow downstream customers (especially streaming consumers) to correctly account for the multiple secondary events they might receive. In one embodiment, the join status field can be set to the following values:

1. FAILED: Indicates that the primary event was not available at the time when the secondary event arrived (prior to step 620*a*).
2. SUCCESS IN ORDER: Indicates that the primary event was received prior to the secondary, and that a successful in order annotation was performed (prior to step 618*a*).
3. SUCCESS OUT-OF-ORDER: Indicates that the primary event was received after the secondary, and that a successful annotation was performed, but that a downstream consumer may have received a prior failed join attempt (prior to step 632*a*, discussed infra).

If the method (600*a*) classifies the event as a primary event in step 608*a*, the method (600*a*) proceeds to process the primary event in steps 626*a* through 634*a*.

In step 624*a*, the method (600*a*) queries the distributed data to determine if the primary event exists in the join table. In the illustrated embodiment, the method (600*a*) extracts the join key in the event and looks up the row matching the join key and determines if the column associated with the primary event is null.

In step 626*a*, the method (600*a*) writes the event to the join table if the event is not in the join table. Specifically, the method (600*a*) inserts some or all the event data into the join table for the join key.

In step 628*a*, the method (600*a*) looks up the secondary event in the join table. In some embodiments, this lookup may be performed as part of step 624*a*, when the distributed database is queried.

In step 630*a*, the method (600*a*) determines if the secondary event column for the join key of the primary event is null. In the illustrated embodiment, this check is identical to the step in 624*a*, albeit for the secondary column.

As illustrated, in step 622*a*, the method (600*a*) labels the secondary event based on the branch in 630*a* and before emitting the events in steps 632*a* and 634*a*. In the illustrated embodiment, labeling the secondary event comprises setting a join status header field of the secondary event. In the illustrated embodiment, the labeling prior to step 632*a* comprises labeling the secondary event as "SUCCESS OUT-OF-ORDER" as described previously since the primary event was received after the secondary event.

In step 632*a*, the method (600*a*) emits a joined secondary event if the secondary event is present. In this case, the secondary event was received before the primary event and thus an out-of-order join can be performed. In the illustrated embodiment, the method (600*a*) executes the join logic on the secondary and primary events to annotate the secondary event with one or more fields from the primary event.

In step 634*a*, the method (600*a*) emits the primary event. Notably, the method (600*a*) always emits the primary event in step 634*a*, regardless of the check in step 630*a*. If a secondary event is available, the method (600*a*) will thus emit two events for the single received primary event.

As illustrated, the method (600*a*) satisfies the greedy requirement in that annotation occurs as soon as it is possible. In most lambda pipelines, the streaming component does not attempt the out-of-order join, because it is less common, requires more storage, and the batch pipeline will catch this case with less effort. By being greedy about the join, downstream consumers are provided a fully annotated secondary event as soon as both elements have successfully passed through the pipeline.

As discussed, in the out-of-order join scenario, the stream processor will ultimately violate the principal that received and emitted events should match one-to-one. To remedy this, since $S^-$ and $S^+$ would logically contain the same fact key, the two records will be compared by the auditor (310) and successfully deduplicated. Without intervention, however, an arbitrary record may be picked, which could result in either $S^-$ or $S^+$ being written. The success conditions require that $S^+$ be chosen if the primary P is counted toward COB. Thus, the auditor (310) is configured to always select an annotated secondary to a lonely secondary by inspecting the join status flag set in step 622*a*.

Further, in some scenarios, it is possible that even though $S^-$ and P are written to the streaming queue (408*b*), that $S^+$ is lost somewhere in the system. The auditor (310) would not be able to detect this case without performing its own join, and thus, would not declare $S^+$ as missing. This results in the system not correctly producing an annotated record when all parts were available. To remedy this problem, the system modifies the close of books process via two conditions. In the first condition, the system ensures that in the out-of-order join scenario, that if P is successfully written to the streaming queue (408*a*), then any $S^-$ annotated to P will be prevented from being written to the certified fact feed, because $S^+$ is required in this case. In the second condition, the system ensures that the method (600*c*) applies strict ordering to the processing of events for the same join key. In other words, if a primary and secondary event for the same join key enters the method (600*c*) at the same time, the results must be no different than if the events entered in a more defined order with a time lag.

With these restrictions, when close of books is certified on the primary events, the auditor (310) will be able to presume that all out-of-order annotated secondary events s+ required for the success condition have been written to the streaming queue (408b). In general, the primary cause of failure against the success conditions at this point is the arrival of an $S^+$ record after an $S^-$ with the same join key. If even one $S^+$ is dropped between the join stage (method 600c) and the dedupe store (414), then COB can't be declared. But if the first condition is satisfied, then the existence of $S^+$ in the streaming queue (408b) may be inferred by the presence of P. And the presence of P is implied by the COB on the primary events. Therefore, the solution under the first condition above is to delay auditing of secondary events until COB is declared on the primary events. This ensures that if P is necessary for COB, that P will be replayed if it is missing for some reason. Technically a late primary event could arrive after COB, but the success criteria does not demand that it be processed correctly since it is late. Essentially these conditions are necessary to ensure success due to various things that might go wrong in between the method (600c) performed by the join stage of the stream processor and the spooler (308).

Any processing after the method (600c) is performed could cause the out-of-order $S^+$ event to be dropped after it was annotated. If the $S^+$ event is dropped, then only the $S^-$ will arrive at the auditor (310). When close of books happens, the $S^-$ event will be enough to close out the batch window, thus the pipeline will write $S^-$ out to the fact feed (210). This violates the success conditions as $S^+$ is bound to a primary event that may contribute to COB. However, if the first condition is implemented, then the pipeline will ensure that $S^-$ is not written to the certified feed due to the presence of an out-of-order P. It is quite possible that a P will never arrive, in which case the $S^-$ is acceptable to be spooled. But if P is present, then $S^-$ must be prevented from spooling.

The second condition prevents a race for writing and reading from the join table. Essentially, if the method (600c) is parallelized, it could happen that two joinable events S and P with the same join key could travel through the method (600c) at the same instant. In this case, the pipeline must ensure that at least one of the events is affected by the passage of the other. If two threads A and B executing the code in parallel. Thread A is processing the primary event and thread B a secondary event that joins back to the same primary. If the order of operations is that thread A fetches from the join table and B fetches from the join table before A gets a chance to write its event, then both A and B will be unable to emit an annotated event. Essentially, the system ensures that if two joinable events enter the method (600c), that at least one of the events will exit the method (600c) with a reference to the other one. Otherwise, if both events make it to the end of the pipeline without annotation, they will satisfy close of books but fail the criteria for successful joining. Thus, this implies the second condition, that the pipeline must ensure a strict order of the fetches and writes with the join table for events with the same key.

In some embodiments, the method (600c) will receive repeated secondary events for the same join key. For example, it is possible for example that two distinct clicks may happen on the same serve. In some systems the second click is considered non-countable and thus may be invalidated, but in others, it is considered countable and thus must be preserved. Regardless of countability, the secondary event must pass all the way through the pipeline to satisfy the auditor (310). To allow this, the join table is configured to store multiple secondary event records against the same join key, and the method (600c) must read all of them from the join table when looking for the out-of-order condition.

In another embodiment, if multiple secondary events are required to be joined back to the same primary, only a few modifications to the method (600c) are necessary. Additional columns for each secondary event are required, and the first condition discussed above needs to be modified accordingly as such. Specifically, the system ensure that in the out-of-order join case, that if P is successfully spooled to the fact feed, then any $S_1^-, S_2^-, \ldots, S_n^-$ sharing the same join key as P will be prevented from spooling to the respective secondary event fact feed. Thus, the method (600c) itself becomes more complex in the production of the out-of-order join case. All secondary columns in the join table must be scanned to look for early arriving secondaries. For any early arrival, the method (600c) should emit their annotated versions. The primary optimization is that a single join table is used. For COB checking, all secondary COB checks must be dependent on the same primary COB check, but can be independent of one another.

As described above, to support the join procedure described in FIG. 6A, two conditions must be met. In the second condition, the system ensures that the method (600c) applies strict ordering to the processing of events for the same join key. In other words, if a primary and secondary event for the same join key enter the method (600c) at the same time, the results must be no different than if the events entered in a more defined order with a time lag. To implement this condition, the system utilizes a join table with transactional guarantees around get and put commands, or synchronization in the stage itself is required. In one embodiment, field grouping by the stream processing may be used if the distributed database does not provide such guarantees. By specifying the join key as the field grouping key, the stream processor will ensure that all events with the same join key are routed to the same processing node (e.g., bolt) and thus the same thread of processing. Once events are traveling into the same processing step, sequencing can be performed within the thread itself.

In the first condition, the system ensures that in the out-of-order join scenario, that if P is successfully written to the streaming queue (408a), then any $S^-$ annotated to P will be prevented from being written to the certified fact feed, because $S^+$ is required in this case. Essentially for each successful out-of-order join annotation, the pipeline must ensure that any failure to process the annotated secondary record will also result in the failure of the processing of the triggering primary event. Many existing pipeline designs will create parallel paths to process events of different types. Such designs may make it impractical to enforce the second condition (discussed previously) within the pipeline itself as the design requires bringing the primary and secondary events back together again in the same stage.

In an alternative embodiment of FIG. 6A, the method (600a) annotates each primary event with a list of the secondary events that were joined to it out-of-order. For example, if a primary event P enters the method (600a) and a secondary event S is found in the join table with id s, then the key s should be annotated to P as a forward reference. Thus, in the out-of-order case, the method (600a) will emit the events P{s} and $S^+$ to downstream components where P{s} represents event P with the added reference key s. Essentially, the primary event is modified to contain the forward reference of any out-of-order secondary event it finds in the join table. The list of forward references may contain multiple events if there are multiple events being joined to the primary, i.e., one per secondary event. For example, presume the method (600a) receives impression event X with id x and the join table already contains click event Y with unique id y and join key x. In this case, the method (600a) will detect an out-of-order join event and will emit the impression X and the click Y downstream (note that click Y should have already been emitted earlier, but unannotated due to the absence of X). Click Y will now be fully annotated with all fields of X, and it will have a join status indicating out-of-order. Impression X will be annotated with the forward reference y of Click Y. Thus, the impression event identifies which click events it caused to be emitted out-of-order.

Finally, in some embodiments, the method (600a) may be augmented to support reentry of events during a replay. Suppose that a primary event is replayed due to COB processing. When the primary event reaches the method (600a), it may find a secondary event waiting for it along with a copy of itself. In some embodiments, if the replayed primary event knew whether each secondary event in the join table was successfully annotated and written to the streaming queue, it would be unnecessary to emit the secondary event. However, the only way to obtain this knowledge would be to lookup the secondary event somehow, or replay it with the knowledge that the secondaries were done in order.

FIG. 5A is a block diagram illustrating a streaming pipeline with support for join operations according to some embodiments of the disclosure.

As illustrated, the pipeline (500a) includes a stream processor (304), streaming queues (306), spooler (308), and auditor (310). These components were described generally in the previous Figures and those details are not repeated herein. In contrast to the previous Figures, FIG. 5A illustrates parallel paths for primary and secondary events. In the illustrated embodiment, any of the components may be implemented in a distributed processing system and thus more of fewer such paths may exist.

In the illustrated embodiment, events are received by the stream processor (304) from the data highway (204). The stream processor (304) processes these events in zero or more pre join stages (502a) may perform various operations as described previous (e.g., parsing, explosion, annotation, etc.). The pre-join stages (502a) then emit the partially processed events to a join stage (504a). The join stage (504a) performs some or all the methods described above in connection with FIG. 6A. In brief, the join stage (504a) performs the annotation. Input to the join stage (504a) will be primary and secondary events requiring sessionization. The output will be annotated or lonely secondary events as well as primary events.

In some embodiments, each event emitted from the join stage will require the following additional attributes. For primary events, an out-of-order emission set may be added to the event. In one embodiment, the out-of-order emission set comprises a set of secondary event identifiers and event types for any annotated secondary event that was created in the out-of-order case. The out-of-order emission set corresponds to the forward references discussed above. Both the event type and the identifier are added to correctly identify the duplicate entries to be flagged. For secondary events, a join status field is set for each event. The join status comprises a value such as that described in the context of step 622a.

As illustrated, the join stage (504a) is communicatively coupled to a join table (508a). In some embodiments, the join table (508a) comprises an HBase database or other type of database that provides persistence and snapshotting capabilities. In some embodiments, snapshots are created to support reprocessing of events, so that the join table (508a) state can be reconstituted in the event that past data needs to be reprocessed. The structure of the join table (508a) has been discussed previously and that discussion is not repeated herein.

The output of the join stage (504a) passes through post-join stages (506a). Like, pre join stages (502a), the post-join stages (506a) may perform zero or more processing steps on the joined data and these stages are not limited in the disclosure. In the illustrated embodiment, the post-join stages (506a) are configured to multiplex the events to the primary and secondary dedupe bolts (510a, 512a) based on the headers of the event (e.g., the presence of a join status or the presence of a list of secondary identifiers, or the lack of either). In the illustrated embodiment, the dedupe bolts (510a, 512a) implement the first condition described previously. In brief, the primary dedupe bolt (510a) iterates over the emission set and posts a primary signal event to the secondary streaming queue (516a) for each secondary event it identifies.

In some embodiments, both the join stage (504a) and the dedupe bolts (510a, 512a) utilize a watermark cache to ensure that each event does not incur the penalty of a full read/write.

A spooler (308) includes a primary spooler (518a) and secondary spooler (520a) to spool primary and secondary events for writing to disk, respectively. The spoolers (518a, 520a) operate as previously described, with the exception that the secondary spooler (520a) partitions events by join status as well as the primary out-of-order signal. By writing into separate files, it is easier for the auditor (310) to efficiently discard events not intended to go into the certified feed.

As discussed, the auditors (522a, 524a) retrieve data from the spoolers (518a, 520a) and certify the spooler data for writing to a certified fact feed. In the illustrated embodiment, the primary auditor (522a) certifies the primary events before it signals the secondary auditor (524a) to attempt to certify the secondary events. Additionally, the secondary auditor (524a) must respect the primary out-of-order signal to implement the first condition. Essentially for each row key and versioned value set it obtains from the secondary spooler (520a), the auditor (524a) first determines if at least one version of the secondary event has join status "SUCCESS IN ORDER" or "SUCCESS OUT OF ORDER." If it does, the auditor (524a) picks the most recent received version of these events and writes this event to the certified feed. Alternatively, if the primary signal is not present then the auditor (524a) writes nothing to the certified feed (essentially skipping any join failures). Finally, if neither of the previous conditions are met, the auditor (524a) writes out the most recent version of the secondary event to the certified feed, which will be lonely and have join status FAILED.

Pipelines that perform joins between events where the cardinality of primary and secondary events are nearly identical with short time dilations may benefit from an imposed delay in the join stage. Essentially, with so many primary and secondary events hitting the data highway and the pipeline at the same time, the probability of an out-of-order join is much higher. In such a pipeline, secondary events could be queued and delayed by a configurable margin. In other words, if the join table gets a secondary event for which no primary exists, it could choose to hold the secondary in memory for a short time window to allow the primary event a chance to appear. The small delay in processing may reap large gains in efficiency downstream if it can be shown that less out-of-order secondary join events are posted. As discussed above, in the out-of-order join scenario, if the primary does show up, the pipeline will have emitted two events. Some pipelines may not have the luxury of imposing a delay if the business requires absolute near real time processing of the un-joined secondary events.

The above-described system pipeline (500a) supports most reporting use cases, requiring downstream consumers to filter events based upon the join status. However, some downstream consumers may require emission of lonely secondary events. As discussed above, in some embodiments, the pipeline (500a) is configured to not certify lonely secondary events. However, clicks with annotation joins that succeeded are more appropriate for doing analysis. In this case, the consumer wants the union of all annotated events and lonely events. This union is represented in the fact feed after certification. However, in the previous system (500a) the certified fact feed is only provided after the auditor verifies the processed events, thus certified events are not provided in rea-time. This is due to the fact that a secondary event cannot be labeled lonely until after the audit. Only when the audit is complete can the pipeline identify that the lost primary is never coming. The following alternative embodiments provide near real-time output of lonely events.

In a first embodiment, the downstream consumer can ingest the certified feed. This technique eliminates real time ingestion but works as expected. The downstream consumer could also scrape the certified feed for lonely events and merge those with the successfully annotated events it processed in real time. To support this more efficiently, the spooler (308) is configured to partition the certified feed into files or directories that clearly delineate which events are lonely. This allows for the efficient loading of lonely events without a full feed scan. In another embodiment, the pipeline launches a process to post the lonely events after the certified feed is posted. This would build off of the partitioning concept above. In this embodiment, the auditor (310) triggers a spout to read the lonely events and post them to the streaming queue with a new join status value of "CERTIFIED LONELY." The spooler (308) then omits writing any events with this join status to the fact feed, as they have only been posted for streaming queue consumers and the records already exist in the certified feed.

In general, a stream processor (304) should not annotate events with mutable values. For example, textual names and other values should generally not be joined or annotated with an event based on a database lookup as these values are mutable and may change. If an underlying dimension annotation changes, the previously annotated event (as certified) will be incorrect. Generally, however, immutable values may properly be annotated to events. Two examples of common immutable values are object relationships (i.e., relationships between events) and point in time attributes (e.g., the current value of a fee at an instant time). Generally, any value that is associated with a point in time can be considered immutable as the presence of a point of time hardens even a mutable value to an immutable one. For example, the title of a product may change but at a specific point in time, its value is constant.

There are two types of dimensional annotations: types 1 and 2. A type 1 dimensional annotation comprises an overwritten value. For example, a price value may change from one value to another is a type 1 dimensional annotation. Type 1 dimensional annotations suffer from the problem that historical data is not saved during the overwrite. Type 2 dimensional annotations handle revision histories and thus store historical states. Type 2 dimensional annotations are implemented by inserting an entirely new event with the updated (i.e., overwritten) value and a pointer back to the previous event.

A primary technical problem with existing pipelines is missing dimensional annotation keys. Consider a campaign where the user has just added a brand new creative and a pipeline that is required to lookup the creative's media type (e.g. text, video, image, etc.) Depending on the speed of the application and ad server caches, it is quite possible that the time lag between the insertion of the new creative record and the ad serving selecting it for an impression is only seconds long. When the pipeline receives the log of the event, it may not have received the new creative's attributes. This would result in the pipeline being unable to correctly dimensionally annotate the event. Current pipelines compensate for this deficiencies by either annotating the event with an "unknown" value or marking the entire event as invalid if dimensional annotation fails. This technique only works if the delay between a dimensional update and the pipeline being aware of it is small and stable and only if the consumer is able to absorb the overhead of dropping events. Most batch pipelines, however, will schedule their batch jobs with a dependency on both the dimensional snapshot and the event batch. Thus, as an example, events in the 12:05 to 12:10 time interval will require a 12:10, 12:15, 12:30, or even 13:00 snapshot of the dimensional tables in order to proceed. Since the batch pipeline may require several minutes to receive a complete batch, such a dependency is generally acceptable and is not a viable option for low latency systems.

In addition to the foregoing, another issue that occurs in existing pipelines is out-of-sync dimensional updates. This is an analog to the problems with missing keys that primarily affects point in time attributions. Suppose that same dimensional value whose presence imparts a fee. If the lag between the dimension being updated is small (e.g., ten seconds) the system may still properly handle the event. But a lag of several hours will most likely cause large problems with either over or undercharging customers. In addition, the out-of-sync issue also tends to cause problems with reprocessing. Suppose that a pipeline contains a bug and must reprocess data from three days ago. If the data is processed using the current dimensional state, rather than the state from three days ago, it will create inconsistencies. Expounding upon this exposes another issue with streaming pipelines that differs from batch. In a batch pipeline it is easy to attribute an entire batch interval with a consistent dimensional snapshot. Every record will be annotated using the same dimensional state. In a streaming pipeline, this is much more difficult to achieve as events are not necessarily processed in sequential order.

A naïve solution to the foregoing problems would be to provide a dimensional cache accessible to the stream processor and implement a separate processing node or step that accesses the cache to annotate events in real time. However, most pipelines perform anywhere from five to 20 dimensional annotations. Querying a dimensional store many times (e.g., 20) per event will significantly impact the availability of the dimensional store given the speed at which events are received, regardless of implementation. Many dimensional stores (such as MySQL) will fail under the load. Thus, a local in-memory cache is necessary for efficiency. But even current in-memory caches are not sufficient. Specifically, many systems provide dimensional tables that will not easily fit in the memory of a single machine. In a streaming design, many of these issues become exacerbated. Consider the missing dimension issue. In a batch pipeline, a simple dependency between the events being processed and the dimensional snapshot that applies to them is sufficient. If either dependency is delayed in any way, the batch job waits until both data sets are available before executing. In a streaming environment, the dependency solution no longer exists. The pipeline will effectively have an event awaiting annotation and only a few seconds to deal with it. A streaming pipeline cannot wait long enough.

Another issue with large dimensions is how to update the in-memory caches. Most pipelines employ dimensional snapshotting. Essentially every N minutes, the pipeline executes a full dump of the dimensional table (or projection thereof) into some type of efficient lookup file. When dealing with large dimensions, this may become unwieldy, as it might take more than N minutes to perform the dump.

FIG. 5B is a block diagram illustrating a streaming pipeline according to some embodiments of the disclosure.

In the illustrated embodiment, a pipeline (500b) includes a dimension support system (516b) communicatively coupled to a stream processor (304). Various details of the stream processor (304) have been provided previously and are not repeated herein.

The dimension support system (516b) includes a dimension store (512b). The dimension store (512b) represents a source of truth for dimensional state for the pipeline (500b). Although it could be the actual master store used by the platform, in some embodiments the dimension store (512b) comprise a replica of a master store. In the illustrated embodiment, the dimension store (512b) provides a bulk query interface and, optionally, a point lookup service. In one embodiment, the dimension store (512b) comprises a My SQL database although various other types of dimension stores may be used such as Oracle, HBase, and periodic HDFS dumps.

The dimension support system (516b) additionally includes a scheduled bulk query component (506b). The processes performed by the scheduled bulk query component (506b) are described in more detail below.

In a first operation, the scheduled bulk query component (506b) executes (or otherwise coordinates) a bulk query against the dimension store according to the stores abilities and limits. In the illustrated embodiment, the scheduled bulk query component (506b) may be configured to run at various intervals and dependencies based on the needs of the system (516b). For example, a MySQL based job may run at regular intervals and be set so that only one instance may be running at a time to prevent overlaps. Another implementation may set a data dependency on a path that is populated with a regular dimensional dump. In either case, the purpose of the bulk query is to obtain the relevant dimensional data for the pipeline (500b) and publish it for the pipeline (500b) to utilize.

In a second operation, the scheduled bulk query component (506b) assembles a dimensional lookup file set containing the dimension values and uploads the lookup file set to the file system. In some embodiments, this operation requires a definition of a lookup file set. In some embodiments, this definition specifies that the file set should support both a single full snapshot, or a snapshot with one or more delta updates. Additionally, the definition specifies that the format of the file set should be optimized for consumption by the pipeline (500b). This means that as soon as the file is downloaded by the pipeline (500b), it should be immediately usable as a lookup source. The annotation stage (502b) is not required to parse the file line by line to index or map it before being able to use it. The second operation completes when all the necessary components of the file set have been updated to the file system.

In a third operation, the scheduled bulk query component (506b) then publishes the dimensional lookup file set to the dimension directory (510b). In this operation, the scheduled bulk query component (506b) publishes the file set to the dimension directory (510b) which is described in more detail below. The dimension directory (510b) provides a lookup table whereby the pipeline (500b) can determine dimensional state by batch interval and publish time. The dimension directory (510b) basically only stores the file paths on the filesystem, rather than the dimensions themselves, reducing the size of the table. Once this step is complete, the job executed by the scheduled bulk query component (506b) is considered a success.

In some optional embodiments, the scheduled bulk query component (506b) performs a fourth operation which includes posting a signal event to the bulk query spout (504b) indicating the newly published file set. In some embodiments, if this operation fails, the job is not required to restart. This operation transmits a notification to the pipeline with the new file set definition. This operation allows the pipeline (500b) to respond instantly without needing to poll the directory.

In some embodiments, the publish time must fall within the batch interval. If a bulk query implementation for a five-minute batch interval takes seven minutes, then the scheduled bulk query component (506b) cannot publish to the batch interval that was open when the query started.

As discussed above, the dimension support system (516b) includes a dimension directory (510b). In some embodiments, this directory (510b) comprises a single column distributed database (e.g., HBase) table. In alternative embodiments, if the contents of the table are small enough, a relational database management system (RDBMS) or similar system could be used. In the illustrated embodiment, the column stores the file set definition and the key to the table should be composed of a dimension name, batch interval, and publish time. In some embodiments, these fields are ordered. In one embodiment, the dimension name refers to the table name (e.g., "line" or "account") but may include any unique name by which this lookup is known. The batch interval refers to the batch interval that this file set is valid for. In general, this will be the batch interval containing the publish time, but it could vary in the case that a dimensional set must be replaced for reprocessing. The publish time refers to the timestamp at which the dimensions were made available to the pipeline (500b). In a MySQL-based implementation, this would be the timestamp at which the query was finished. For an HDFS-based system, it could be the timestamp of the HDFS directory from which the dimensions were extracted.

In some embodiments, the file set definition comprises a JSON structure or similar serialized data structure. A file set should essentially provide the ability to characterize a dimensional dump in terms of both full dumps and deltas. In addition to the file references themselves, the name, publish time, and batch interval may also be included.

The dimension support system (516b) includes one or more dimensional snapshots (508b). In the illustrated embodiment, the dimensional snapshots (508b) comprise a set of files stored in the file system containing the prepared dimensional file sets.

In the illustrated embodiment, the stream processor (304) includes a bulk query signal spout (504b). In the illustrated embodiment, the bulk query signal spout (504b) a spout that allows a set of file definitions to be posted to the pipeline as they become available and is callable from the scheduled bulk query component (506b). The bulk query signal spout (504b) provides a notification queue that enables the pipeline to react to new dimension file sets as soon as they become available. In some embodiments, the bulk query signal spout (504b) is directly connected to every annotation stage (502b) in the stream processor (304) via a broadcast stream. Thus, when one dimension file set update is received, all annotation stages (502b) should be informed.

In the illustrated embodiment, the dimension support system (516b) includes an optional dimension lookup service (514b). The dimension lookup service (514b) allows the pipeline (500b) to handle instances when batch updates are late or incomplete with respect to missing dimensions. Consider the case where a new creative is uploaded and launched just after a periodic batch update. It may be possible in this scenario that an impression event against this new creative is received prior to the next batch update. In this case, the annotation stage (502b) will be unable to properly annotate the record. If a dimension lookup service (514b) is available, the annotation stage (502b) may be able to query the dimensional store indirectly through the service and annotate before proceeding to post-join stages (506a).

One of the primary concerns of the dimension lookup service (514b) is to protect the dimensional store. In a MySQL implementation, the dimension lookup service (514b) may be connected to a replication slave that is trying to catch up on replication. Because replication is behind, the pipeline (500b) may be experiencing a large number of records with missing dimensions, which may cause the annotation stage (502b) to try the dimension lookup service (514b) repeatedly. This flooding of the replication slave with thousands of queries looking for the missing dimension will most likely delay replication even further. Therefore, the dimension lookup service (514b) should maintain a configurable throttle on the maximum number of queries that it may perform against the dimension store over time.

In some embodiments, the dimension lookup service (514b) comprises a RESTful web service that supports an endpoint for executing a preconfigured named query for a single dimensional key and returns a serialized data object (e.g., JSON object). In some embodiments, the service (514b) implements a least-recently used (LRU) cache. The LRU cache stores the results of dimensional query requests made to the store, to prevent repeat requests. An example of an LRU cache entry is provided below:

```
{
  rowExists: true,
  cacheExpiration: "2016-07-10T12:35:10.123Z",
  rowLock: <object>,
  rowData: {
    id: 12345,
    media_type: "Video",
    pricing_type: "CPM",
    price: 10
  }
}
```

The cache design caches both successful queries where the row is found and unsuccessful. In some embodiments, the LRU cache is designed to cache an unsuccessful query to prevent bad actors from masking valid requests. Consider a situation where an ad server starts populating a dimensional identifier with a corrupted value as part of a bug. This could cause the annotation stages (502b) to continuously request a value that will never exist at a very high rate. In a given rate-limited time interval, 99% of the requests could be for this bug's value, while 1% are valid. By caching the bad request, the dimension lookup service (514b) can return that result to the caller without impacting the rate limiting, allowing other valid requests make their queries. In this way, no request can dominate the limited bandwidth, as all request results are cached. In one embodiment, the expiration date on rows in the cache are calculated based on two different timeout intervals, one for found and one for not found so that misses can expire before found. For example, say a 5-minute expiration when a row is found, but a 5-second expiration when a row is not found, to force the query to try again more often for missing rows. In addition, the cache maintains a rowLock object which comprises a mutex that prevents multiple parallel requests from initiating a query against the same dimensional value.

In the illustrated embodiment, the cache allows for annotation at the rate required by the pipeline. To achieve this goal, each annotation stage (502b) needs to be configured so that it can handle a high percentage of lookups via local memory cache hits. This means that each annotation stage (502b) holds an entire dimension set in memory, possibly several versions for various open batch intervals. In one embodiment, the annotation stage (502b) utilizes a constant database (CBD) file fronted by an LRU cache. The LRU cache reduces paging for large CDB files that do not fit in memory on skewed dimensions. In some embodiments, 80% of the events are covered by 20% of the dimensional space. An LRU cache exploits the frequency of these events allowing direct memory access. The CDB backend provides a disk page cached version that allows most lookups to hit active memory, but not necessarily all of them. Tuning the LRU and memory used by the annotation stage (502b) allows this design to be flexible.

In some embodiments, file definitions allow for delta processing, which means that several CDB files may be in flight for a single logic file set definition. Thus, for a single published definition, the annotation stage (502b) will check the LRU cache, check the delta CDB's in reverse order, and then perform a full dump until a record is found. If a record is found, update the LRU cache and proceed with processing. Thus, in some embodiments, the LRU cache is designed to cache a group of CDB files.

As described, delta processing in this manner does not allow for "deleted" dimensions. In nearly all systems, dimensions are never truly "deleted", rather they are soft-deleted by marking the record in some way. The only generally permitted deletes in a database are association table deletes, which are generally modelled as set attributes rather than as association objects. Because the delta design utilizes chaining, it may not be possible to know that a dimension was deleted versus it was unchanged in an interval. If this knowledge is necessary, the bulk query system will need some method of creating a "deleted object" dimensional value.

In the illustrated embodiment, cache maintenance occurs whenever the annotation stage (502b) detects that a new dimensional file set is available. This can occur via the signal spout (504b), or by periodic inspection of the dimension directory (510b). In some embodiments, both techniques may be used to ensure high availability. As discussed above, the cache itself is a mapping between batch intervals and cache objects. The mapping is not necessarily one to one, as two or more batch intervals may share the same cache object. In one embodiment, the cache mapping process is designed to conserve as much memory as possible, using the file URI (Uniform Resource Identifier) values as a unique key, which allows two distinct file definitions to share the same files.

For each batch interval, zero or more dimension file sets may be published. In the case of zero, the batch interval will inherit the most recently published dimension file set prior to that interval. So for example, if batch interval X does not have a published dimension file set, it will officially use the most recently published dimension file set from X−1, X−2, etc. until one is found. This is accomplished by scanning in the dimension directory (510b) in reverse order by key which includes the batch interval as the prefix key. For example, in a system that have 5-minute batch intervals but hourly dimension updates, the file set published at 1500 would be used for all 12 batch intervals 1500 to 1555. The reverse is also possible, a pipeline on 5-minute batch intervals could get 1-minute updates. Thus, the 1525 batch interval might reference 5 distinct file sets at 1525, 1526, 1527, 1528, and 1529. Thus, the many to many relationship. In some embodiments, each dimension file set is cached as a distinct object. So, in our hourly example, the 1500 file set would have a single object caching all requests against that file set and the reverse example would have 5 objects caching 1525 to 1529 respectively.

In one embodiment, each dimension file set has exactly one full dimension snapshot and zero or more deltas, but that snapshots and delta files could be shared among multiple sets. For example, suppose our 1-minute example worked as follows. At the top of every 5 minutes, we get a full dimensional dump, but for every minute after, a delta is produced. In this example the file sets appear as:

1525->{full: "base1", delta: [ ]}
1526->{full: "base1", delta: ["delta1"]}
1527->{full: "base1", delta: ["delta1","delta2"]}
1528->{full: "base1", delta: ["delta1","delta2","delta3"]}
1529->{full: "base1", delta: ["delta1","delta2","delta3", "delta4"]}
1530->{full: "base2", delta: [ ]}
. . . .

The above format is efficiently uses memory, as five different dimensional states are represented by a single large file and four much smaller files, rather than keeping five full snapshots in memory instead. Processing-wise, it is slightly less efficient as multiple hash lookups against different memory pages must be performed, but LRU caches should provide relief at the expense of one more in the worst case. In addition, multiple deltas could be collapsed into singles, though for many dimensions, the deltas may very well be empty, in which case the delta should be omitted entirely.

In some embodiments, the annotation stage (502b) maintains a mapping between each batch interval and the cache objects that are in use with that interval. In this embodiment, every batch interval is assigned a cache object before events for that batch interval can be processed, even if there is no published file set for that interval. This is done by looking backward in time to find the most recently prior published set. For each mapping, there is a primary cache that will be used on all subsequent events. For example, when file set 1528 is published during batch interval 1525, it shall supersede file set 1527.

Given this structure, when a newly published file set is detected by the annotation stage (502b), it affects the batch interval to which it is published, as well as every other active batch interval afterwards that was depending on the cache object this currently replaces. In one embodiment, there should not be more than on active batch after the one it is published against, since the publish time must occur in a batch interval, and the signal should come shortly after that either due to the signal spout (504b) or polling.

Before the file set can be mapped, each file in the set must be resolved by downloading it from the filesystem. In some embodiments, this downloading is done in a background thread, rather than blocking the pipeline. Alternatively, if the annotation stage (502b) has no valid mapping for the current interval, which occurs during initialization or periodically when replaying an event from a prior interval that is no longer cached, the downloading may be performed via a foreground task. That is, in some embodiments, if any event arrives in the annotation stage (502b) from a batch interval for which a viable cache object is not available, the annotation stage (502b) should pause and load the most recently published cache for that interval or prior. For example, suppose the annotation stage (502b) initializes during interval X. The annotation stage (502b) initializes by loading the latest dimensions published for interval X. When an event for interval X+1 arrives, the annotation stage (502b) need not pause, because the dimensions for interval X are valid for X+1. But if an event for interval X−1 arrives, the annotation stage (502b) will need to wait until interval X−1's dimensions can be loaded. In some embodiments, a limited pause (e.g., using a timeout) can occur, at which point, if the cache is not ready, it can drop that event and move on. A later replay will enable complete processing of the event. In some embodiments, because files are shared between cache objects, only new files need to be loaded from the file system since the files are considered immutable when published and only one copy is needed in memory at a time.

In some embodiments, the annotation stage (502b) performs an additional maintenance operation the very first time that an event for a batch interval arrives. The first event for each batch interval will cause a new batch interval and mapping to be tracked. The new batch interval inherits the mapping from the prior interval.

Additionally, in some embodiments, the annotation stage (502b) will also need to expire items from memory from time to time. It multiple file sets are published during a batch interval, then it is always safe to expire all but the most recent. In the example of five one-minute updates per batch interval, file set 1526 may be expired as soon as 1527 is available. Also, any batch interval that is closed may be safely expired as well. Thus, the annotation stage (502b) should poll a scoreboard looking for opportunities. Otherwise, an "unsafe" expiration may be necessary. In this case, the oldest batch interval cache objects should be expired in anticipation of closing, but a warning should be issued so that a site engineer knows that caches were expired early and a reconfiguration may be necessary to ensure that sufficient batch intervals may be kept in memory at all times.

In some embodiments, the dimension lookup service (514b) performs the following method in response to a request. First, the service (514b) should check the LRU cache to see if the requested value was attempted recently. If the LRU contains an entry for the requested value and the expiration has not passed, then the entry immediately to the caller either as an HTTP 200 OK or an HTTP 404 Not Found depending on the row status. If no entry exists, the entry should be created with a pending query status so that other threads can lock appropriately. If no result is available, the thread should obtain a lock on the row lock object. Upon obtaining the lock, the cached value should be checked again to see if a result may be returned, otherwise, the lock is held as the thread continues. Next, the service (514b) should check if making another query would violate the maximum query rate against the service. This can be a local check rather than a shared check from other instances in say a zookeeper ring or similar. The number of independent query lookup service hosts should be considered when setting the rate limiting. If the local check would violate the current rate limiting, then the service should return an HTTP 503 Service Unavailable indicating that rate limit is exceeded and the lock should be released. If the rate limit is not exceeded, then the service (514b) should obtain a connection to the dimension store (optionally using connection pooling), construct and execute a query for the requested value. In the case that the query comes up with a value, that value should be serialized into a JSON response, placed in the LRU cache, and then returned to the caller. If the value is not found, then the service (514b) should return an HTTP 404 Not Found to the caller. The evidence of the call should be recorded against the internal stats for the next round and the lock should be released, allowing any pending threads to inspect the new status of the cached row.

In the illustrated embodiment, the annotation stage (502b) performs annotation of events based on the dimensions. As indicated above, the pipeline (500b) may have one or more annotation stages, although only one is illustrated in FIG. 5B. An annotation stage (502b) handles one or more named dimensional queries. In some embodiments, a single annotation stage (502b) performs a single annotation. For each query, the annotation stage (502b) attempts to annotate the required output fields with the corresponding lookup annotations. In addition, the annotation stage (502b) reacts to the newly published dimensional file sets and maintains internal caches. In some embodiments, the operations of the annotation stage (502b) are customizable, in which case, the annotation stage (502b) functions as an annotation framework.

The annotation stage (502b) receives two input signals, a publishing signal and an event to annotate. The publishing signal comprises a signal to update internals and is described further herein. In the illustrated embodiment, when the event to annotate is received by the annotation stage (502b), the annotation stage (502b) performs one of four actions.

FIG. 6B is a flow diagram illustrating the annotation of an event in a stream processor according to some embodiments of the disclosure.

In step 602b, the method (600b) receives an event. In some embodiments, the event was processed by one or more stream processing steps prior to being received.

In step 604b, the method (600b) determines if event requires annotation. If the event does not require annotation, the method (600b) skips annotation and immediately emits the event to the next processing stage. In this scenario, the event does not require annotation by the annotation stage (502b) and thus the event will be passed through unchanged. For example, if the annotation is on a line item id, and the event does not carry a line item id (e.g., null). It could also happen that the event's type is not qualified. For example, there may be no reason to annotate a click event with an annotation that is only for impression events. In some embodiments, an abstract function may be called by the framework to determine if an annotation should even be attempted.

In step 606b, the method (600b) performs an annotation. In the illustrated embodiment, the method (600c) utilizes the dimension support system (516b) to annotate the event. The methods performed in the previous description of the system (516b) are not repeated in detail herein but are incorporated herein in their entirety.

In one embodiment, the method (600b) identifies the most recently published dimensional file set for the event's batch interval. In some embodiments, the method (600b) chooses a file set definition that satisfies the dimensional annotation requirements. This file set definition will be used to satisfy annotations against this event and named dimension combination.

The method (600b) then calls the implementation to perform the annotation and passes a callback object that allows for lookups to be performed. In some scenarios, it is possible for the method (600b) to request a list of ids, but the entire list may not be known until a lookup has been performed. Consider a recursive dimension with parent identifiers that must be traced up to the root. In this case, upon doing an initial lookup, a new lookup is needed. A request response would be difficult to use in this case; thus, a callback may be used instead.

In some embodiments, the method (600b) uses the callback object to perform lookups against the chosen dimensional file set. For each identifier that is looked up, the method (600b) executes a lookup against the chosen file set. This includes checking the LRU cache, delta files, and full sets until a value is found.

If an annotation cannot be found in the cache object assigned to the event's batch interval and the cache object is not the most current, the method (600b) can check the most current cache to see if the dimensional row may be found there. This situation may occur for late or reprocessed events. It may also be configurable, to prevent lookups that are far into the future.

If an annotation still cannot be found and the named dimension supports a dimension lookup service, the method (600b) can query the service (e.g., 514b) to look for the new dimension. In one embodiment, the same techniques used to protect the dimension source in the lookup service can be built into the method (600b) to prevent overload of the dimension lookup service including rate limiting and remembering the result of recent attempts.

The results of the lookup are then returned to the method (600b). In one embodiment, the return value will either be a record indicating success that contains all of the dimensional attributes for the given identifier, or a response code indicating that the identifier was not found.

The method (600b) then uses the dimensional attributes to populate new fields within the event. The method (600b) then returns a status to the framework indicating either success or failure in performing the annotation.

In step 608b, the method (600b) determines if the annotation was successful. In the illustrated embodiment, a successful annotation refers to the scenario where the method (600b) can identify a suitable published dimensional value for the batch interval and identifier for the received event, then the method (600a) may successfully compute the required dimensional annotations and store them in the event. The annotated value may be a calculation rather than the lookup. For example, revenue might be computed based upon the event type, pricing type, and price which requires custom logic that the framework does not have, so this action should be abstracted by the framework as well. If the annotation succeeds, the method (600a) emits the event with annotations.

Alternatively, in step 610b, the method (600b) indicates one or more missing annotations if the annotation is only partially successful. In this scenario, if the method (600b) cannot identify a suitable published dimensional value for the batch interval and identifier for the event, then the method (600b) may choose to ignore the missing value and annotate the event accordingly. In this case, the pipeline (500b) indicates that a missing dimensional value is acceptable for this particular annotation and that the failure has been handled by the implementation. For example, it may not be a serious failure if a targeting profile is not available at annotation time, as the values are only used for analytics, and thus this event may be ignored by such analysis later.

Alternatively, in step 612b, the method (600b) flags the event for replay if the annotation fails completely. In this step, the method (600b) may fail to annotate the event. In this step, if the method (600b) cannot identify a suitable published dimensional value for the batch interval and identifier for this event, then the method (600b) may choose to fail the event outright due to a missing annotation. Failing the event will cause the event to be marked in such a way, that the event will be considered missing by the initial processing of the auditor (310) and replayed later. The event will still be passed on to later stages, rather than being dropped at this time, but the event forces a replay (subject to thresholds).

In the illustrated embodiment, an annotation failure occurs when no annotation may be found for a dimension either by cache or lookup service if available. In some embodiments, the method (600b) is selective about which annotations should result in failures and which should not, as there is a performance and storage penalty for replaying. In some embodiments, an annotation failure is treated similarly to a join failure, in that system will allow a later revision. In join processing, if the primary is not available when a secondary is processed, the system can identify that a revision to that event might show up later if the primary were to arrive. An annotation failure may result in the same processing. Thus, the pipeline may later emit a revised version of the event's related facts that contain properly annotated events.

The following examples are provided to further explain annotation failures. Suppose that a pipeline that receives two key files on every impression, the line_id and the ad_size_id. Line_id identifies the buyer of the ad position, and thus without it, it is impossible to charge the advertiser, apply order and account level budgets, or similar. The ad size is used to lookup the width and height of the ad that was served. In this case, a pipeline would be justified to allow line id lookups to fail an annotation, because of how critical the field is to invoicing. On the other hand, a missing ad size id would most likely just cause some errant reporting, that could later be fixed with a simple patch. In this case, the pipeline would not be configured to fail records due to a missing ad size. Thus, pipeline implementations must consider what annotation operations can result in failure. In general, if a missing annotation would make the event non billable or non-reportable, then failure is probably justified. However, failure should be intelligent. Consider an impression event for which traffic protection or some other issue would prevent the record from being valid anyhow. In this case, a failed annotation is unimportant anyway, so there is no reason to fail it in the annotation stage (502b).

To implement step 606b, the method (600b) adds an annotation status field to each event. In some embodiments, the status field indicates whether the annotation was a success or failure. Success indicates that all performed annotations succeeded (or were skippable, i.e., partial). Failure indicates that at least one important annotation failed and thus the event may need to be replayed in some fashion. A pipeline implementation on the other hand may want to know which important annotations failed. In this case, in other embodiments, the pipeline add its own annotation status bit flags or reason code, and record them in the annotation stage (502b) themselves.

In the illustrated embodiment, the auditor (310) is configured to compare the number of failed annotations to an annotation failure threshold before triggering COB. The auditor (310) provides a configurable threshold such that if replay is only necessary because of failed annotations and the number of failures is less than or equal to the threshold, then the auditor (310) may close out the interval without attempting replay. Otherwise, if replay is necessary because of other issues, or there are significant failed annotations, the auditor (310) replays all of the missing annotations with everything else to re-execute the method (600b).

After either outcome, the method (600b) will emit the event to the post-annotation processing stages (step 614b).

The above method (600b) works on a single event with a single dimension. However, in other embodiments, multiple dimensions may be necessary against a single event. In these embodiments, memory constraints may force a pipeline to split annotation among several stages (each executing method 600c). Stage one may be responsible for one set of dimensions, and stage two may be responsible for a second set, etc. By having the system force isolation of the dimensions, the pipeline can easily remap dimensions to different stages without a change to the method (600b), only configuration and initialization. The following provides an alternative embodiment for supporting multiple annotation stages executing the method (600c).

First, the pipeline must guarantee the order in which dimensional attribution occurs. Consider a pipeline that must annotation dimensions with a parent child relationship like Line and Order. In this case, the framework must allow the pipeline implementation to specify that line annotations precede order annotations, because the pipeline must use the line's order id attribute to perform the order lookup later. Second, this implies that the implementation must store the order id in the event at line lookup time, so that it is able to retrieve it when the order is looked up later. In this manner, the physical location of the dimensional annotation logic is independent of the logic itself.

In contrast to existing pipelines, there are distinct advantages to performing dimensional annotation inside a streaming environment versus batch. Primarily, annotating in a streaming pipeline allows a pipeline to spread out the memory requirements across annotation stages (502b) versus batches. In batch pipelines, when too many dimensions are annotated within the same batch job, you run into memory issues, where there is not enough memory on a node to hold sufficient dimensions in caches. The only way to fix this in a batch pipeline is to perform two batch jobs, with different sets of dimensions each. This works, except that it requires double the disk input/output (I/O) between batches. In a streaming platform, only network I/O between physical annotation stages (502b) is required. FIG. 5C illustrates this configuration and includes identically named components as FIG. 5B. Descriptions of those identically named components are not repeated herein.

Thus, in a multi-stage pipeline, each annotation stage is an island that interacts with the various dimension management components independently. Each annotation stage only responds or interacts on the named dimensional queries that it requires, ignoring dimensions managed by other stages. In this environment, the bulk query signal spout (504b) must be setup to broadcast to all annotation stages (502b). It could be configured such that every annotation dimension is assigned its own stage. In some embodiments, some dimensions may be relatively static with only 50 or so values compared to other dimensions that may be millions in cardinality. Thus, the configuration of stages should be configured based on the memory requirements and dimensional ordering and assign dimensions to annotation stages in the pipeline configuration.

Various other alternatives may be implemented alone or in combination with the foregoing annotation stage design.

In some embodiments, it may be advantageous to hold an event locally without emitting and trying again in a short amount of time. For example, if an event attribution id is not found in the cache, but a background thread is currently loading a new cache, the annotation stage (502b) may pause and not emit with a failure to see if the missing value appears in the cache. This is similar to holding a click event that fails to join for a few hundred milliseconds to see if the impression appears later. In some embodiments, this option is a configurable optimization, as some pipelines may not wish to delay at all if they have tight SLA requirements for a consumer that doesn't care if failures occur, like a budget feedback loop.

In another embodiment, the annotation stage (502b) provides an out of order annotation function by spooling events that fail to annotate to memory or disk. If the annotation shows up in the next cache update or lookup service request, any spooled events keyed to that a particular missing identifier could be re-annotated and emitted. This would prevent waiting for replays. In this case, the annotation stage (502b) needs to index a local store by missing attribute values. When a lookup service succeeds for a value that was previously missing, a background thread can launch to de-spool prior missing events. Likewise, when a new cache is downloaded, a background thread can check each missing value currently being tracked to see if any of them can now be resolved.

In some embodiments, most dimensions using numeric primary keys are generated in a monotonically increasing sequence. In other words, the first record is one, the second is two, up to a maximum integer value. This makes it possible to do a quick range check when looking up a dimensional value to see if a value is cached. For example, if a record requires a lookup of value 123, but the cache is known to contain only values 1 to 120, then there is no reason to look in the cache. In view of this, the bulk query job (506b) may be configured to record the minimum and maximum key value of a dimension and store this in the dimensional file set definition. This embodiment can help avoid checking individual files by performing a range check prior to looking in the file. But the real value of the optimization is in the auditor. If the event is annotated with the query name and ID for the first failed annotation during processing, then the auditor can perform a range check against the latest dimensional set in the pipeline. No events need to be replayed due to failed annotations that also fail the range check, as the replay will not be able to find the missing dimension. For non-numeric keys or for numeric keys that are sparsely populated, a time stamp can be used as well. The event can then be annotated with the most current publish time of the available caches in the annotation stage (502b). Then the auditor (310) can check the most recently publish time in the dimension directory to see if any new dimensional updates are available. If there are no new published caches, then there is no reason to replay the record.

For large dimensions, it may be advantageous to separate them into their own annotation stage (502b) and provide a grouping stream on the key lookup field. For example, consider a large dimension like a search term key which may be hundreds of megabytes in size. To speed annotation, a grouping stream can direct events with the same search term to the same annotation stage (502b). This allows the annotation stages (502b) to effectively cache only a portion of the dimensional values. At a minimum, the LRU caches will be more efficient. Rather than a field grouping, the system may hash the dimensional values into buckets beforehand as part of the bulk query job. Each annotation stage (502b) in the annotation group for that dimension would be assigned a portion of the buckets that it will cache. When the dimensional file set is published, the stage need only copy the buckets that it will receive events for. A custom stream then sends events to the appropriate bucket. This method has the advantage of lessening the number of bytes that need to be downloaded by each annotation stage (502b). Better failover may be achieved by having buckets managed by two different annotation stages (502b) with a stream that round robins between both annotation stages (502b) assigned to a bucket until one goes down. This allows other annotation stages (502b) to shoulder the burden of a failed annotation stage (502b).

Figure 7:
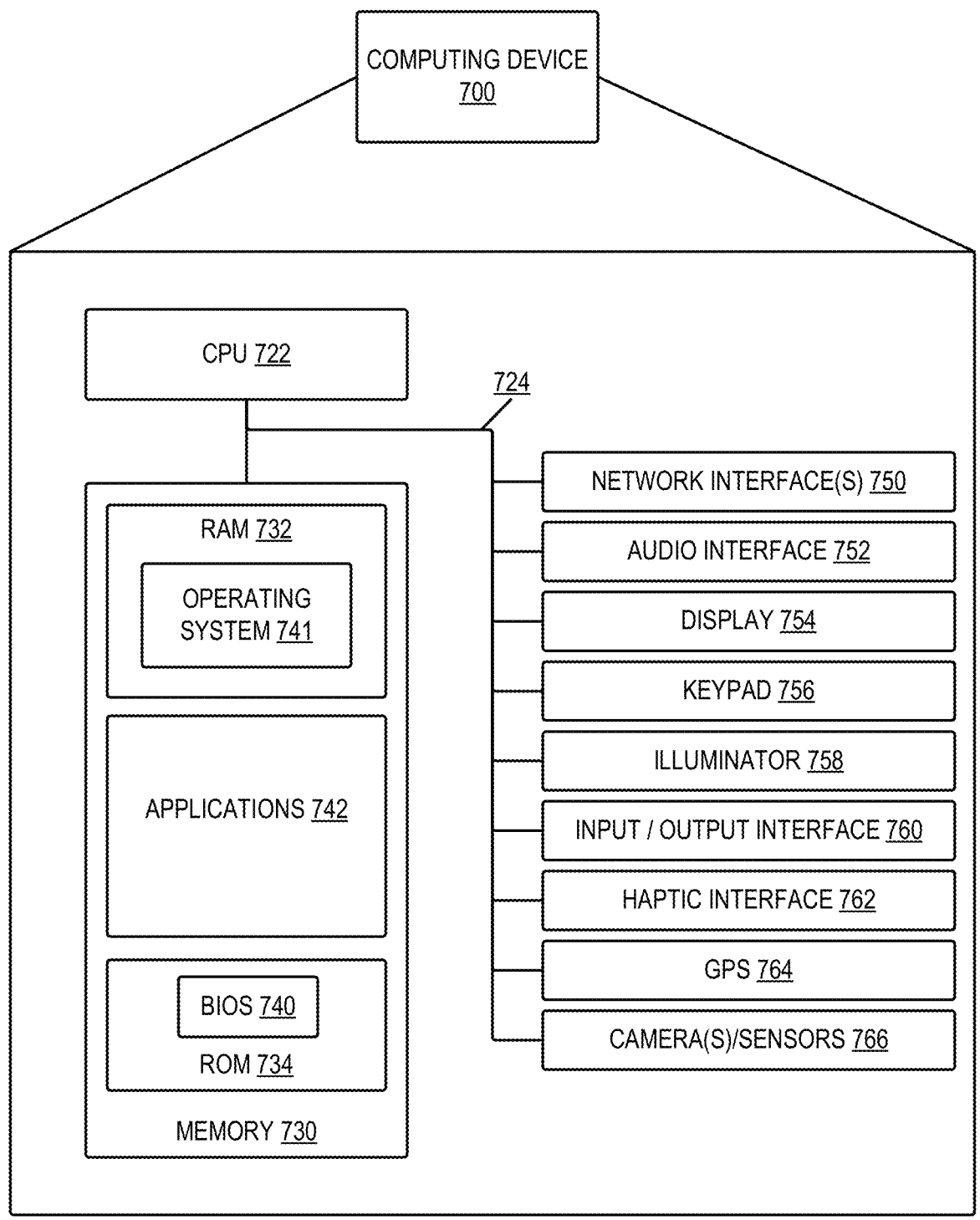
FIG. 7 is a schematic diagram illustrating a computing device showing an example embodiment of a client or server device used in the various embodiments of the disclosure.

FIG. 7 is a schematic diagram illustrating a computing device showing an example embodiment of a client or server device used in the various embodiments of the disclosure.

The computing device (700) may include more or fewer components than those shown in FIG. 7. For example, a server computing device may not include audio interfaces, displays, keypads, illuminators, haptic interfaces, GPS receivers, cameras, or sensors.

As shown in the figure, the device (700) includes a processing unit (CPU) (722) in communication with a mass memory (730) via a bus (724). The computing device (700) also includes one or more network interfaces (750), an audio interface (752), a display (754), a keypad (756), an illuminator (758), an input/output interface (760), a haptic interface (762), an optional global positioning systems (GPS) receiver (764) and a camera(s) or other optical, thermal, or electromagnetic sensors (766). Device (700) can include one camera/sensor (766), or a plurality of cameras/sensors (766), as understood by those of skill in the art. The positioning of the camera(s)/sensor(s) (766) on the device (700) can change per device (700) model, per device (700) capabilities, and the like, or some combination thereof.

The computing device (700) may optionally communicate with a base station (not shown), or directly with another computing device. Network interface (750) is sometimes known as a transceiver, transceiving device, or network interface card (NIC).

The audio interface (752) produces and receives audio signals such as the sound of a human voice. For example, the audio interface (752) may be coupled to a speaker and microphone (not shown) to enable telecommunication with others or generate an audio acknowledgment for some action. Display (754) may be a liquid crystal display (LCD), gas plasma, light-emitting diode (LED), or any other type of display used with a computing device. Display (754) may also include a touch-sensitive screen arranged to receive input from an object such as a stylus or a digit from a human hand.

Keypad (756) may comprise any input device arranged to receive input from a user. Illuminator (758) may provide a status indication or provide light.

The computing device (700) also comprises input/output interface (760) for communicating with external devices, using communication technologies, such as USB, infrared, Bluetooth™, or the like. The haptic interface (762) provides tactile feedback to a user of the client device.

Optional GPS transceiver (764) can determine the physical coordinates of the computing device (700) on the surface of the Earth, which typically outputs a location as latitude and longitude values. GPS transceiver (764) can also employ other geo-positioning mechanisms, including, but not limited to, triangulation, assisted GPS (AGPS), E-OTD, CI, SAI, ETA, BSS, or the like, to further determine the physical location of the computing device (700) on the surface of the Earth. In one embodiment, however, the computing device (700) may through other components, provide other information that may be employed to determine a physical location of the device, including, for example, a MAC address, Internet Protocol (IP) address, or the like.

Mass memory (730) includes a RAM (732), a ROM (734), and other storage means. Mass memory (730) illustrates another example of computer storage media for storage of information such as computer-readable instructions, data structures, program modules, or other data. Mass memory (730) stores a basic input/output system ("BIOS") (740) for controlling the low-level operation of the computing device (700). The mass memory also stores an operating system (741) for controlling the operation of the computing device (700)

Applications (742) may include computer-executable instructions which, when executed by the computing device (700), perform any of the methods (or portions of the methods) described previously in the description of the preceding Figures. In some embodiments, the software or programs implementing the method embodiments can be read from hard disk drive (not illustrated) and temporarily stored in RAM (732) by CPU (722). CPU (722) may then read the software or data from RAM (732), process them, and store them to RAM (732) again.

For this disclosure, a module is a software, hardware, or firmware (or combination thereof) system, process or functionality, or component thereof. A module performs or facilitates the processes, features, or functions described herein (with or without human interaction or augmentation). A module can include sub-modules. Software components of a module may be stored on a computer-readable medium for execution by a processor. Modules may be integral to one or more servers or be loaded and executed by one or more servers.

The terms "user," "subscriber," "consumer" or "customer" refer to a user of an application or applications as described herein or a consumer of data supplied by a data provider. By way of example, and not limitation, the term "user" or "subscriber" can refer to a person who receives data provided by the data or service provider over the Internet in a browser session, or can refer to an automated software application which receives the data and stores or processes the data.

One of skill in the art may implement the methods and systems of the present disclosure in many manners. As such, the disclosed embodiments are not to be limited by the preceding exemplary embodiments and examples. In other words, functional elements being performed by single or multiple components, in various combinations of hardware and software or firmware, and individual functions, may be distributed among software applications at either the client level or server level or both. In this regard, one may combine any number of the features of the different embodiments described herein into single or multiple embodiments, and alternate embodiments having fewer than or more than, all the features described herein are possible.

Functionality may also be, in whole or in part, distributed among multiple components, in manners now known or to become known. Thus, myriad software/hardware/firmware combinations are possible in achieving the functions, features, interfaces, and preferences described herein. Moreover, the scope of the present disclosure covers conventionally known manners for carrying out the described features and functions and interfaces. The scope of the present disclosure may also cover variations and modifications made to the hardware or software or firmware components described herein as would be understood by those skilled in the art.

Furthermore, the embodiments of methods presented and described as flowcharts in this disclosure are provided by way of example to provide a complete understanding of the technology. The disclosed methods are not limited to the operations and logical flow presented herein. Alternative embodiments exist that alter the order of the various operations or include independent sub-operations that are part of a more extensive operation.

While the disclosure describes various embodiments, such embodiments should not limit the teaching of this disclosure to those embodiments. Various changes and modifications may be made to the elements and operations described above to obtain a result that remains within the scope of the systems and processes described in this disclosure.

What is claimed is:

1. A method comprising:

receiving, at a stream processor, an event, the stream processor including a plurality of processing stages;

querying, by the stream processor, a join table to identify a secondary event associated with the event;

emitting, by the stream processor, the event to downstream consumer if the secondary event is not present in the join table; and emitting, by the stream processor, an augmented event using the event and the secondary event when the secondary event is present in the join table.

2. The method of claim 1, further comprising querying the join table to determine if the event is in the join table prior to querying the join table to identify the secondary event and writing the event to the join table if the event is not in the join table.

3. The method of claim 2, wherein querying the join table to determine if the event is in the join table comprises extracting a join key from the event and querying the join table using the join key.

4. The method of claim 2, wherein querying the join table to identify the secondary event and querying the join table to determine if the event is in the join table comprise a single query.

5. The method of claim 1, further comprising labeling the secondary event if the secondary event is present in the join table.

6. The method of claim 5, wherein labeling the secondary event comprises setting a join status header field of the secondary event in the join table.

7. The method of claim 1, further comprising augmenting the secondary event if the secondary event is present in the join table to form the augmented event, the augmented event including one or more fields from the event.

8. A non-transitory computer-readable storage medium for tangibly storing computer program instructions capable of being executed by a computer processor, the computer program instructions defining steps of:
   receiving, at a stream processor, an event, the stream processor including a plurality of processing stages;
   querying, by the stream processor, a join table to identify a secondary event associated with the event;
   emitting, by the stream processor, the event to downstream consumer if the secondary event is not present in the join table; and
   emitting, by the stream processor, an augmented event using the event and the secondary event when the secondary event is present in the join table.

9. The non-transitory computer-readable storage medium of claim 8, further comprising querying the join table to determine if the event is in the join table prior to querying the join table to identify the secondary event and writing the event to the join table if the event is not in the join table.

10. The non-transitory computer-readable storage medium of claim 9, wherein querying the join table to determine if the event is in the join table comprises extracting a join key from the event and querying the join table using the join key.

11. The non-transitory computer-readable storage medium of claim 9, wherein querying the join table to identify the secondary event and querying the join table to determine if the event is in the join table comprise a single query.

12. The non-transitory computer-readable storage medium of claim 8, further comprising labeling the secondary event if the secondary event is present in the join table.

13. The non-transitory computer-readable storage medium of claim 12, wherein labeling the secondary event comprises setting a join status header field of the secondary event in the join table.

14. The non-transitory computer-readable storage medium of claim 8, further comprising augmenting the secondary event if the secondary event is present in the join table to form the augmented event, the augmented event including one or more fields from the event.

15. A device comprising:
   a stream processor; and
   a storage medium for tangibly storing thereon program logic for execution by the stream processor, the program logic comprising instructions for:
   receiving an event, the stream processor including a plurality of processing stages;
   querying a join table to identify a secondary event associated with the event;
   emitting the event to downstream consumer if the secondary event is not present in the join table; and
   emitting an augmented event using the event and the secondary event when the secondary event is present in the join table.

16. The device of claim 15, the instructions further comprising querying the join table to determine if the event is in the join table prior to querying the join table to identify the secondary event and writing the event to the join table if the event is not in the join table.

17. The device of claim 16, wherein querying the join table to determine if the event is in the join table comprises extracting a join key from the event and querying the join table using the join key.

18. The device of claim 16, wherein querying the join table to identify the secondary event and querying the join table to determine if the event is in the join table comprise a single query.

19. The device of claim 15, the instructions further comprising labeling the secondary event if the secondary event is present in the join table.

20. The device of claim 15, further comprising augmenting the secondary event if the secondary event is present in the join table to form the augmented event, the augmented event including one or more fields from the event.

* * * * *